(12) United States Patent
Yoshimoto et al.

(10) Patent No.: US 11,797,462 B2
(45) Date of Patent: Oct. 24, 2023

(54) ARITHMETIC PROCESSING DEVICE AND MEMORY ACCESS METHOD

(71) Applicant: FUJITSU LIMITED, Kawasaki (JP)

(72) Inventors: Kazuya Yoshimoto, Yokohama (JP); Yuji Kondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/836,227

(22) Filed: Jun. 9, 2022

(65) Prior Publication Data

US 2023/0089332 A1 Mar. 23, 2023

(30) Foreign Application Priority Data

Sep. 22, 2021 (JP) .................................. 2021-153722

(51) Int. Cl.
*G06F 13/16* (2006.01)
*G06F 9/30* (2018.01)

(52) U.S. Cl.
CPC ........ *G06F 13/1673* (2013.01); *G06F 9/3001* (2013.01)

(58) Field of Classification Search
CPC .... G06F 13/1673; G06F 9/3001; Y02D 10/00
See application file for complete search history.

(56) References Cited

U.S. PATENT DOCUMENTS

| | | | |
|---|---|---|---|
| 6,499,072 B1 * | 12/2002 | Frank .................. | G06F 13/4059 710/60 |
| 7,340,577 B1 * | 3/2008 | Van Dyke ........... | G06F 13/4243 711/167 |
| 2005/0081085 A1 * | 4/2005 | Ellis ..................... | G06F 11/1044 714/E11.041 |
| 2005/0114618 A1 * | 5/2005 | Lu ........................ | G11C 7/1039 711/167 |
| 2006/0179262 A1 * | 8/2006 | Brittain ............... | G06F 13/1631 711/105 |
| 2015/0213878 A1 * | 7/2015 | Hashimoto ......... | G11C 11/4099 365/189.05 |
| 2019/0165816 A1 * | 5/2019 | Song ................. | H03M 13/2906 |

FOREIGN PATENT DOCUMENTS

| | | |
|---|---|---|
| JP | 1-180663 A | 7/1989 |
| JP | 10-307747 A | 11/1998 |

* cited by examiner

*Primary Examiner* — Farley Abad
(74) *Attorney, Agent, or Firm* — WHDA, LLP

(57) ABSTRACT

A memory is accessed based on memory access requests that has different data read sizes. A memory access method includes outputting each of read commands corresponding to the plurality of memory access requests to a memory at a timing that avoids conflict of read data output from the memory; generating an output start timing of the data read from the memory to an outside; retaining the data read from the memory in each of buffers, and causing any of the plurality of buffers to output data based on the output start timing; and delaying, in a case of receiving a subsequent memory access request during execution of memory access corresponding to a preceding memory access request, the output start timing of data from the buffer corresponding to the subsequent memory access request from the output start timing of data from the buffer corresponding to the preceding memory access request.

10 Claims, 20 Drawing Sheets

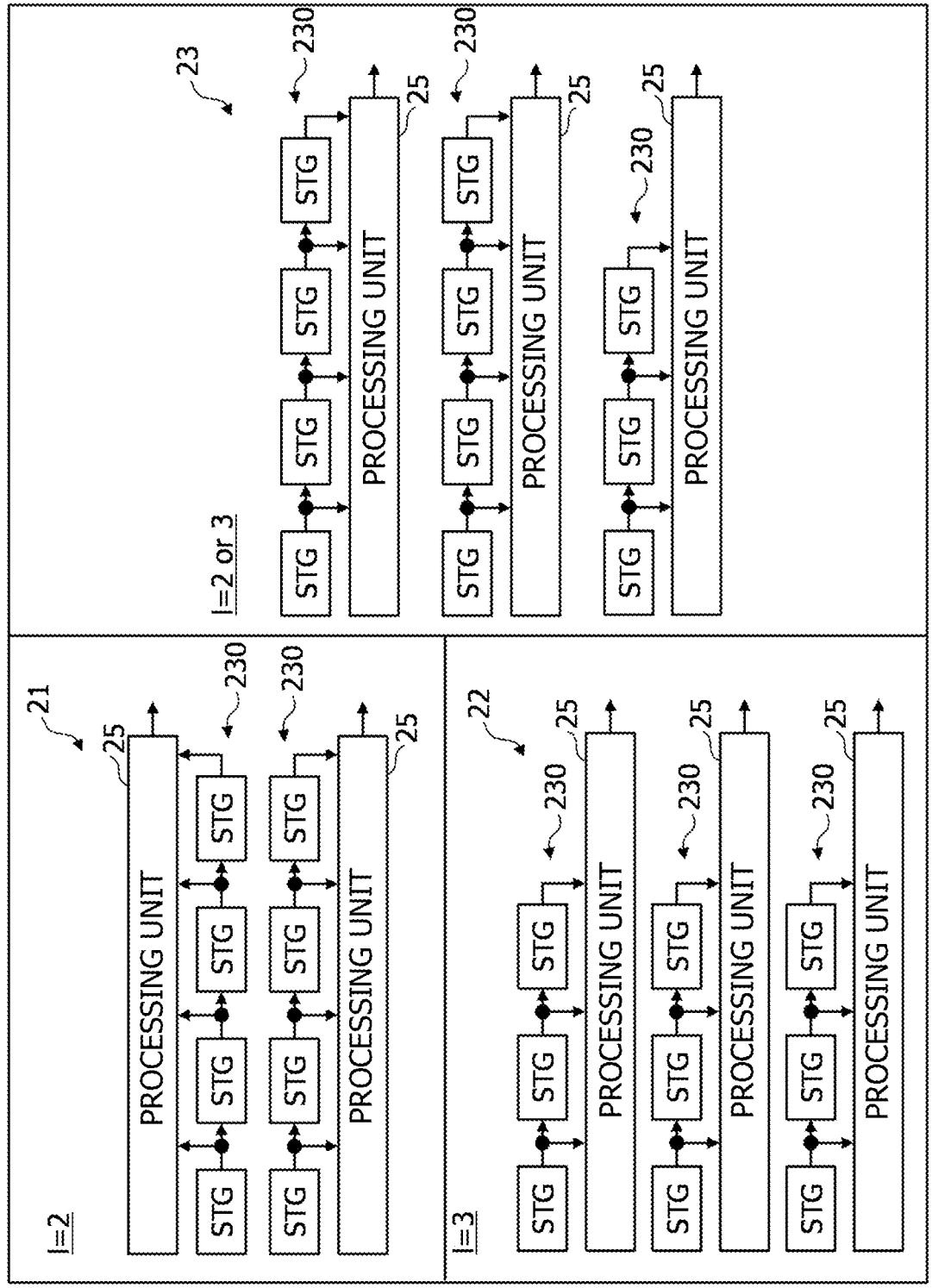

ARITHMETIC PROCESSING DEVICE AND MEMORY ACCESS METHOD

CROSS-REFERENCE TO RELATED APPLICATION

This application is based upon and claims the benefit of priority of the prior Japanese Patent Application No. 2021-153722, filed on Sep. 22, 2021, the entire contents of which are incorporated herein by reference.

FIELD

The embodiments discussed herein are related to an arithmetic processing device and a memory access method.

BACKGROUND

A method of dividing an access request in a unit larger than a unit data length that is an access unit of a main storage device into several access requests corresponding to the unit data length, aligning the order of unit data output from the main storage device and retaining the unit data in a buffer, and making a response is known. Japanese Laid-open Patent Publication No. 1-180653 is disclosed as related art.

A method of suppressing overflow of a reply buffer by counting the number of times of sending a variable length request from a plurality of requesters to a storage device and the number of times of reply data from the storage device is known. Japanese Laid-open Patent Publication No. 10-307747 is disclosed as related art.

SUMMARY

According to an aspect of the embodiments, a arithmetic processing device including: a memory, and a memory access controller for controlling access to a memory on the basis of a plurality of memory access requests that has different data read sizes, wherein the memory access controller includes a processor coupled to the memory and configured to: output, in a case of receiving a plurality of memory access requests, each of read commands that corresponds to the plurality of memory access requests to the memory at a timing that avoids conflict of read data output from the memory; generate an output start timing of the data read from the memory to an outside; retain the data read from the memory that corresponds to each of the read commands in each of a plurality of buffers, and control operation of the plurality of buffers by causing any of the plurality of buffers to output data based on the output start timing; and delay, in a case of receiving a subsequent memory access request during execution of memory access that corresponds to a preceding memory access request, the output start timing of data from the buffer that corresponds to the subsequent memory access request from the output start timing of data from the buffer that corresponds to the preceding memory access request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 20 is a block diagram illustrating an example of a memory access controller according to another embodiment.

DESCRIPTION OF EMBODIMENTS

Figure 1:
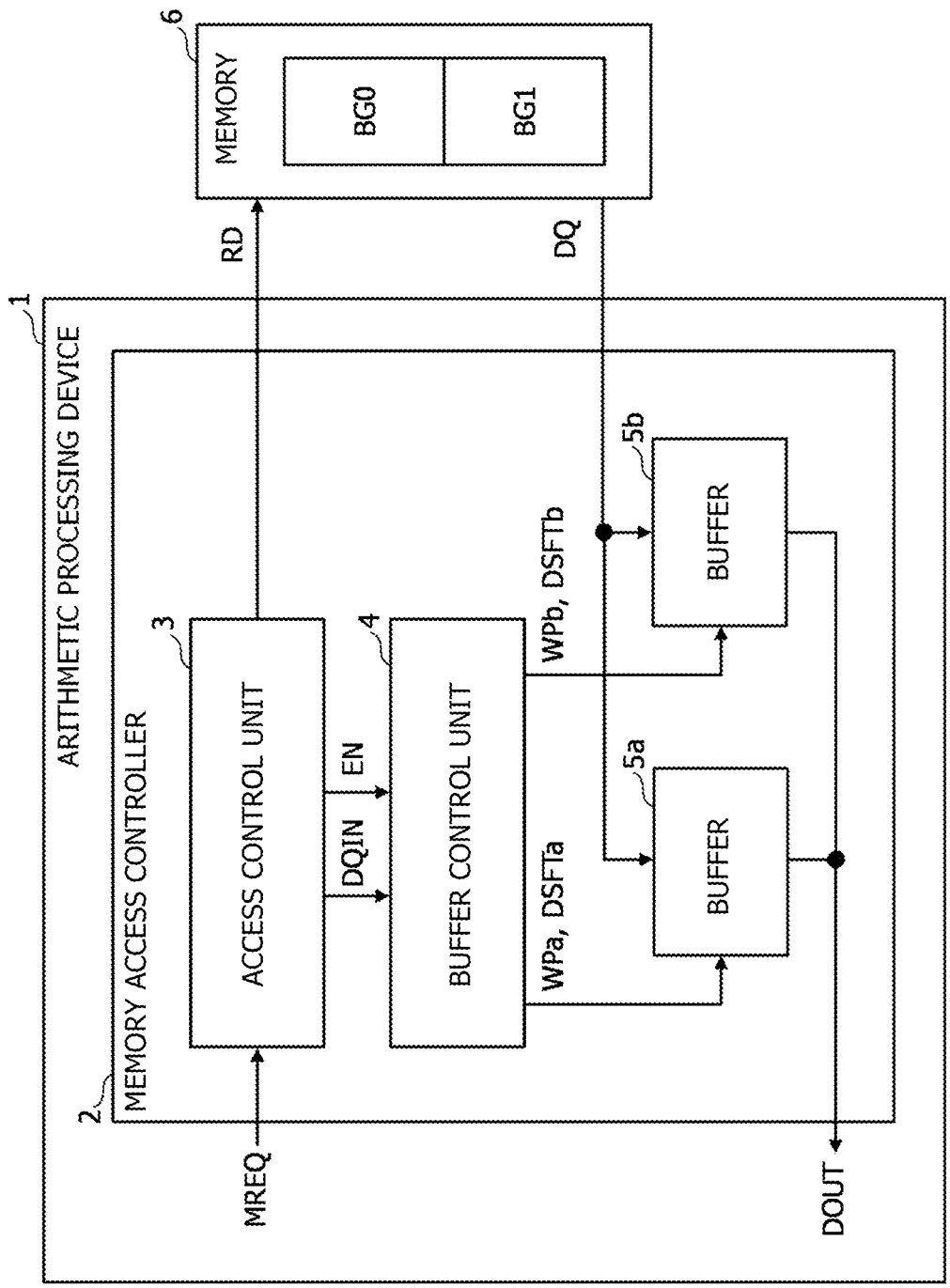
FIG. 1 is a block diagram illustrating an example of an arithmetic processing device including a memory access controller according to an embodiment.

In a case where a memory is accessed by a plurality of types of devices, a read size of data read from the memory by one memory access request may differ depending on the device. For example, it is assumed that a memory access controller that controls memory access receives a memory access request with a large data read size followed by a memory access request with a small data read size. In this case, an issuance order of the memory access request and an output order of response data read from the memory in response to the memory access request to the device may be interchanged. In this case, the response to an issuer of the read data corresponding to the preceding memory access request is delayed, so that processing performance of the device that issues the preceding memory access request may deteriorate.

Hereinafter, an embodiment will be described with reference to the drawings. Hereinafter, a signal line through which information such as a signal is transmitted is assigned with the same reference sign as a signal name. Furthermore, the signal line illustrated by a single line in the drawings may be a plurality of bits.

FIG. 1 illustrates an example of an arithmetic processing device including a memory access controller according to an embodiment. An arithmetic processing device 1 illustrated in FIG. 1 has a memory access controller 2. The memory access controller 2 can control access of a memory 6 on the basis of a plurality of memory access requests MREQ having different data read sizes. For example, the data read size is a size of data DQ read from the memory 6 or the number of times of output of a fixed size of data DQ in response to one memory access request MREQ.

The memory access controller 2 has an access control unit 3, a buffer control unit 4, and a plurality of buffers 5 (5a and 5b). In a case of receiving a plurality of memory access requests MREQ, the access control unit 3 outputs an access command to the memory 6. For example, the memory 6 may have a plurality of bank groups BG (BG0 and BG1) for retaining data.

Hereinafter, an example in which the memory access request MREQ is a read access request and the access control unit 3 outputs a read command RD to the memory 6 will be described. Note that, in a case where the memory 6 is a dynamic random access memory (DRAM), the access control unit 3 may output an active command ACT before outputting the read command RD.

The access control unit 3 respectively outputs the read commands RD corresponding to the plurality of memory access requests MREQ to the memory 6 at timing for avoiding conflict of data DQ (read data) output from the memory 6, corresponding to the plurality of memory access requests MREQ. The access control unit 3 outputs a data input timing signal DQIN to the buffer control unit 4 at timing when the data DQ is output from the memory 6 in response to the read command RD.

The buffer control unit 4 outputs a write pointer value WP (WPa or WPb) to any of the buffers 5 (5a or 5b) on the basis of the data input timing signal DQIN. The write pointer value WP indicates a storage position of the buffer 5 that stores the data DQ read from the memory 6. Then, in the buffer 5a or 5b, the data DQ read from the memory 6 corresponding to each read command RD is stored for each memory access request MREQ. For example, each buffer 5 has a shift register structure (for example, a first-in first-out (FIFO)) structure) that performs a shift operation at the time of outputting the retained data DQ.

The access control unit 3 outputs, to the buffer control unit 4 for each buffer 5, an enable signal EN indicating output start timing of the data DQ retained in the buffer 5 to an outside, at timing when a predetermined amount of data DQ is stored in the buffer 5. The buffer control unit 4 outputs a data shift signal DSFT (DSFTa or DSFTb) to the corresponding buffer 5 on the basis of the enable signal EN. For example, the data shift signal DSFT is a pulse signal and contains as many pulses as the number of data DQ output from buffer 5. The buffer 5 sequentially outputs the retained data DQ as output data DOUT according to the data shift signal DSFT.

Here, it is assumed that the access control unit 3 receives a subsequent memory access request MREQ during execution of the memory access corresponding to the preceding memory access request MREQ. In this case, the access control unit 3 outputs the enable signal EN corresponding to the subsequent memory access request MREQ after the enable signal EN corresponding to the preceding memory access request MREQ. For example, the access control unit 3 delays the output start timing of the output data DOUT from the buffer 5 corresponding to the subsequent memory access request MREQ with respect to the output start timing of the output data DOUT from the buffer 5 corresponding to the preceding memory access request MREQ.

Figure 2:
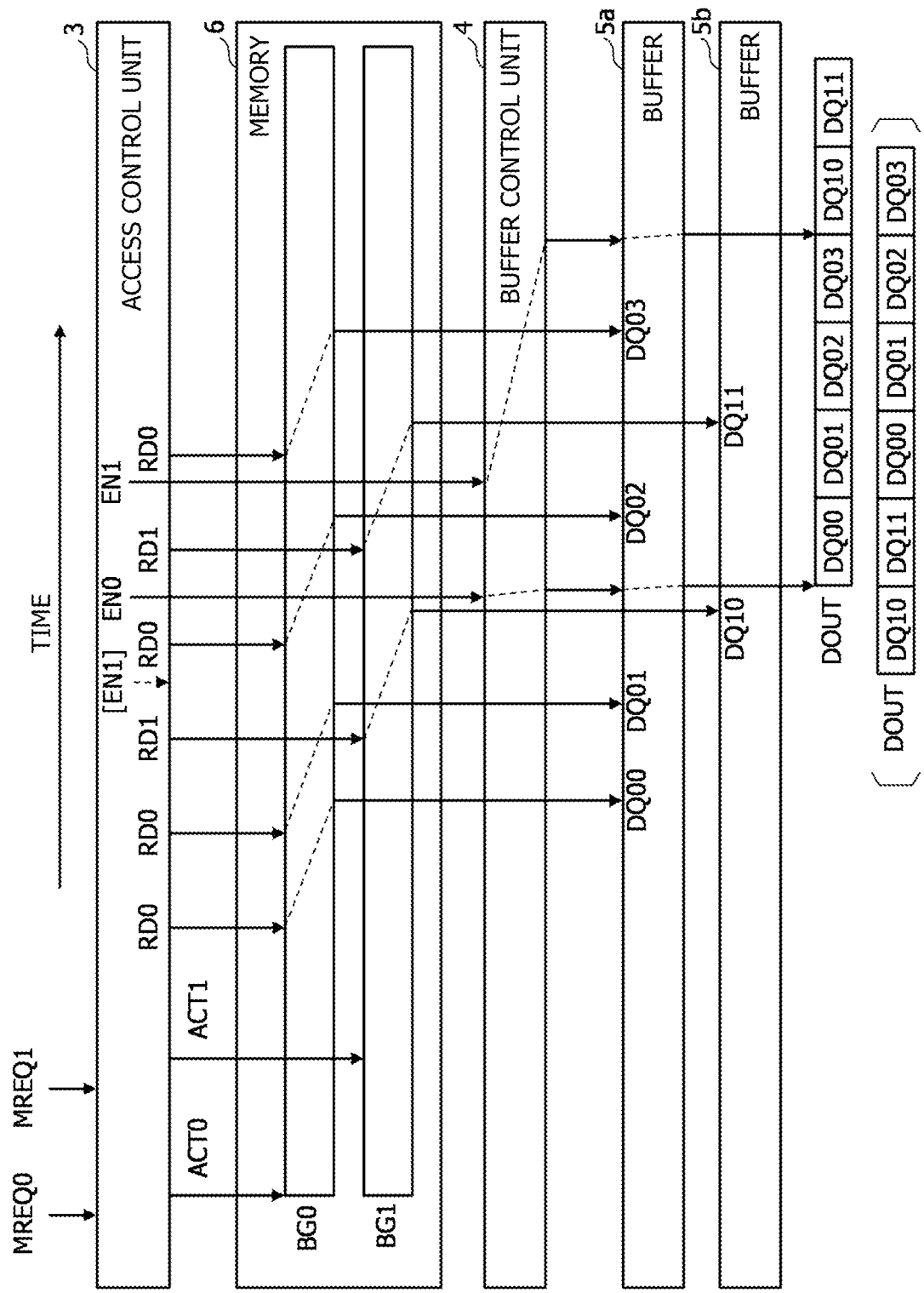
FIG. 2 is a timing chart illustrating an example of an operation of the memory access controller of FIG. 1.

FIG. 2 illustrates an example of the operation of the memory access controller 2 of FIG. 1. For example, FIG. 2 illustrates an example of a memory access method by the memory access controller 2. In FIG. 2, the memory access controller 2 sequentially receives a memory access request MREQ0 for the bank group BG0 and a memory access request MREQ1 for the bank group BG1. The memory access controller 2 outputs an active command ACT0 corresponding to the memory access request MREQ0 to the memory 6, and then outputs an active command ACT1 corresponding to the memory access request MREQ1 to the memory 6.

Next, the memory access controller 2 outputs a plurality of read commands RD0 corresponding to the memory access request MREQ0 and a plurality of read commands RD1 corresponding to the memory access request MREQ1 to the memory 6. For example, the number of times of output of data corresponding to the data read size of the memory access request MREQ0 is "16", and the number of times of output of data corresponding to the data read size of the memory access request MREQ1 is "8". Furthermore, four data DQ are output from the memory 6 with one read command RD. Therefore, the memory access controller 2 outputs the read command RD0 four times corresponding to the memory access request MREQ0 (burst length="4"), and outputs the read command RD1 twice corresponding to the memory access request MREQ1.

The data DQ0 (DQ00, DQ01, DQ02, and DQ03) read from the memory 6 in response to the read command RD0 are sequentially stored in the buffer 5a. The data DQ1 (DQ10 and DQ11) read from the memory 6 in response to the read command RD1 are sequentially stored in the buffer 5b. Note that each of the data DQ00, DQ01, DQ02, DQ03, DQ10, and DQ11 includes four data DQ.

The access control unit 3 outputs an enable signal EN0 to the buffer control unit 4 at the timing when a predetermined amount of data DQ0 is stored in the buffer 5a. Furthermore, the access control unit 3 outputs an enable signal EN1 to the buffer control unit 4 at the timing when a predetermined amount of data DQ1 is stored in the buffer 5b after the enable signal EN0 is output.

The buffer control unit 4 controls the buffer 5a on the basis of the enable signal EN0, and sequentially outputs the data DQ00, DQ01, DQ02, and DQ03 retained in the buffer 5a as the output data DOUT. When receiving the enable signal EN1, the buffer control unit 4 suspends output control of the data DQ10 from the buffer 5b because the data DQ01 is being output from the buffer 5a.

Then, the buffer control unit 4 controls the buffer 5b in accordance with output completion timing of the data DQ03 from the buffer 5a, and sequentially outputs the data DQ10 and the DQ11 retained in the buffer 5b as the output data DOUT. For example, the access control unit 3 delays the output start timing of the output data DOUT from the buffer 5 corresponding to the subsequent memory access request MREQ with respect to the output start timing of the output data DOUT from the buffer 5 corresponding to the preceding memory access request MREQ. Thereby, the memory access controller 2 can output the data DQ in a reception order of the memory access request MREQ even in the case of reading the data DQ from the memory 6 according to the memory access requests MREQ having various data read sizes.

Note that the enable signal EN1 illustrated in the brackets indicates an example of timing to be output after a predetermined period from the first read command RD1 regardless of the presence or absence of the preceding memory access request MREQ0. For example, the enable signal EN1 illustrated in the brackets indicates an example in which the memory access controller 2 does not have the function to delay the output timing of the enable signal EN1 according to the presence or absence of the preceding memory access request MREQ0.

In this case, as illustrated by the brackets, the data DQ1 corresponding to the memory access request MREQ1 is output before the data DQ0 corresponding to the memory access request MREQ0. For example, the data DQ1 and DQ0 are sequentially output in a reverse order of the reception order of the memory access requests MREQ.

As described above, in this embodiment, the memory access controller 2 can output the data DQ output from the memory 6 according to the plurality of memory access requests MREQ having different read sizes of the data DQ to the issuer device according to the issuance order of the access requests MREQ. Thereby, for example, it is possible to suppress a delay in the response to the device of the read data corresponding to the memory access request MREQ0 having a large read size issued before the memory access request MREQ1 having a small read size. As a result, it is possible to suppress deterioration of the processing performance of the issuer device of the memory access request MREQ due to the data read size of another memory access request MREQ.

In a case where the output of the data DQ corresponding to the subsequent memory access request MREQ1 overlaps with the output of the data DQ corresponding to the preceding memory access request MREQ0, the buffer control unit 4 delays the start of output of the data DQ1 based on the reception of the enable signal EN1. Thereby, it is possible to suppress collision of the data DQ0 and DQ1 from the two buffers 5a and 5b. As a result, it is possible to suppress output of the incorrect data DQ (DOUT) from the memory access controller 2.

Figure 3:
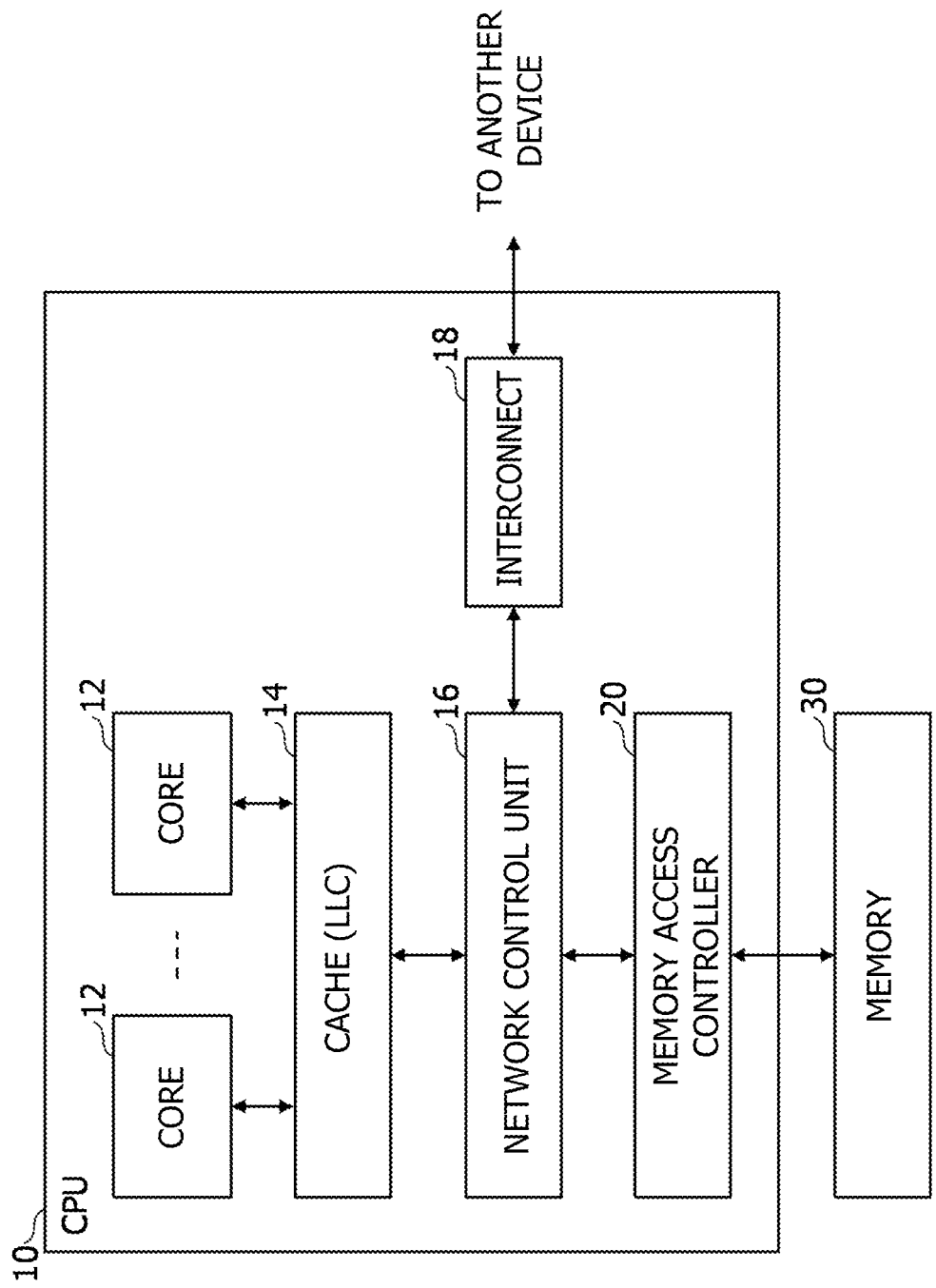
FIG. 3 is a block diagram illustrating an example of an arithmetic processing device including a memory access controller according to another embodiment.

FIG. 3 illustrates an example of an arithmetic processing device including a memory access controller according to another embodiment. An arithmetic processing device 10 illustrated in FIG. 3 is, for example, a central processing unit (CPU). Hereinafter, the arithmetic processing device 10 will also be referred to as a CPU 10.

The CPU 10 includes a plurality of cores 12, a cache 14, a network control unit 16, an interconnect 18, and a memory access controller 20. Each of the cores 12 executes a command stored in the cache 14, and executes an arithmetic operation for data stored in the cache 14. Each of the cores 12 is an example of an arithmetic execution unit.

For example, the cache 14 is a last level cache (LLC), and is commonly connected to the plurality of cores 12. The cache 14 is capable of storing a part of data and commands stored in a memory 30, such as a main memory, and a part of data and commands stored in a memory connected to another device. Although not particularly limited, the memory 30 is a double data rate 4 synchronous dynamic random access memory (DDR4 SDRAM).

The network control unit 16 connects the cache 14, the interconnect 18, and the memory access controller 20 to each other. The interconnect 18 is connected to another device or the like and executes communication with the another device. Here, the another device is an external device connected to the CPU 10. The another device may be another CPU 10 mounted on an information processing device (system) together with the CPU 10, or may be a direct memory access controller (DMAC) mounted on the information processing device together with the CPU 10. The interconnect 18 is an example of an interface unit connected to the external device.

The memory access controller 20 is connected to the memory 30, and controls the access of the memory 30. For example, the memory access controller 20 controls the access of the memory 30 on the basis of the memory access request (MREQ in FIG. 4) issued from the outside of the CPU 10 via the core 12 or the interconnect 18.

In a case where the memory access controller 20 receives the memory access requests MREQ from the inside and the outside of the CPU 10, the data read size (a packet size PS to be described below) may vary. As will be described below, the memory access controller 20 can read data from the memory 30 and retain the read data in a data buffer 280 (FIG. 4) according to a plurality of memory access requests MREQ having different data read sizes from each other. Then, the memory access controller 20 can output the data retained in the data buffer 280 in the reception order of the memory access requests MREQ.

For example, in the case where the memory access request is a read access request, the memory access controller 20 performs read access to the memory 30 to read data stored in the memory 30 on the basis of the read access request. Furthermore, in the case where the memory access request is a write access request, the memory access controller 20 performs write access on the memory 30 to write data on the memory 30 on the basis of the write access request.

For example, the memory access controller 20 reads data of the read size included in the memory access request from the memory 30 according to one memory access request. The data read size may be different between the CPU 10 and another device such as a DMAC, or may be different for each group of CPU 10.

Note that the number of the cores 12 to be mounted on the CPU 10 may be one. Furthermore, the CPU 10 does not have to have the cache 14 and the network control unit 16. In that case, each core 12 is connected to the memory access controller 20.

Figure 4:
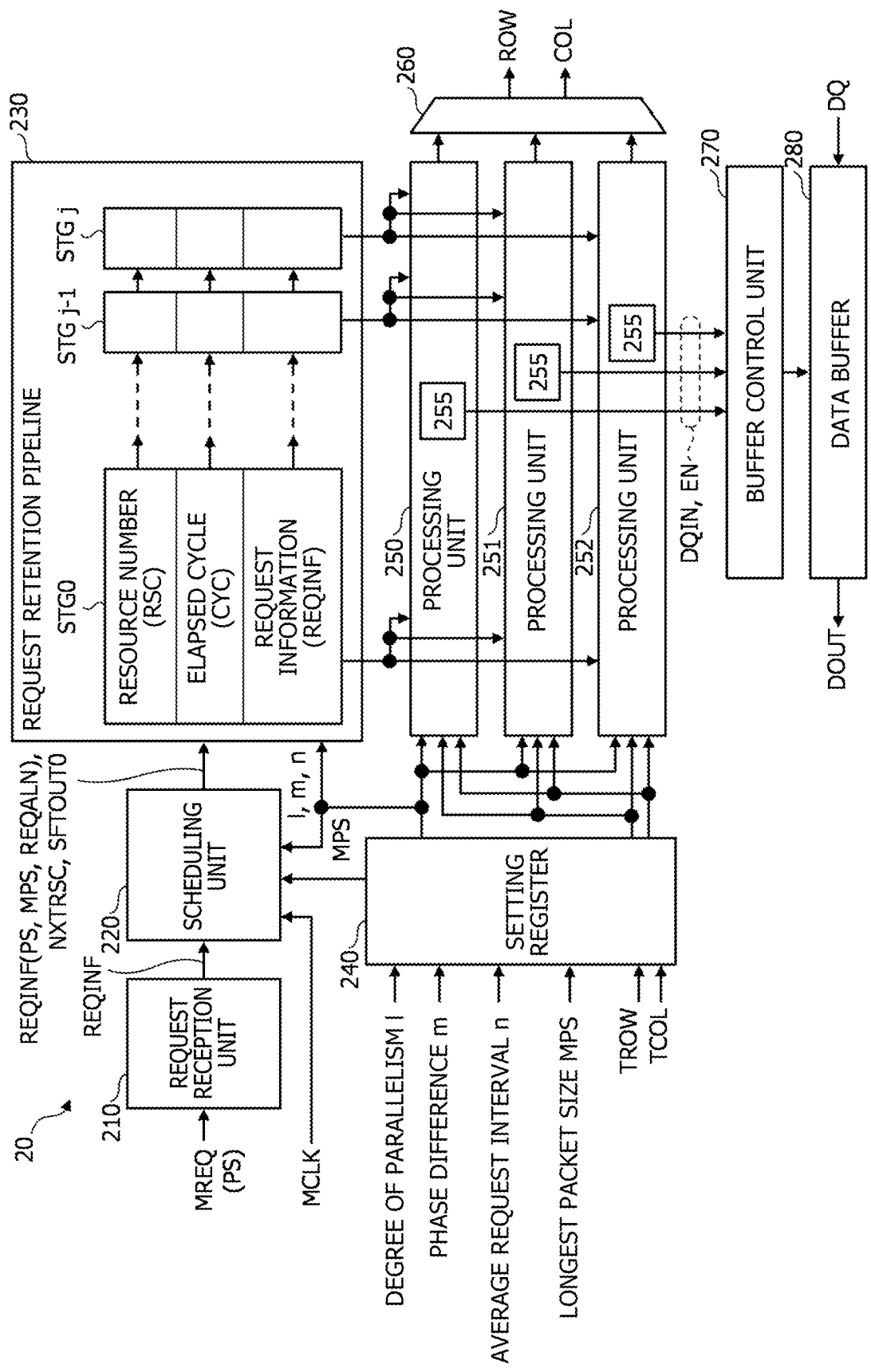
FIG. 4 is a block diagram illustrating an example of the memory access controller of FIG. 3.

FIG. 4 illustrates an example of the memory access controller 20 of FIG. 3. The memory access controller 20 includes a request reception unit 210, a scheduling unit 220, a request retention pipeline 230, a setting register 240, a plurality of processing units 25 (250, 251, and 252), and a selector 250. Furthermore, the memory access controller 20 includes a buffer control unit 270 and a data buffer 280. The scheduling unit 220, the request retention pipeline 230, and the plurality of processing units 25 are an example of an access control unit.

The request reception unit 210 outputs, to the scheduling unit 220, request information REQINF included in the memory access request MREQ received from the network control unit 16 (FIG. 3). For example, the request information REQINF includes an operation type (write or read), a bank address, a row address, a column address, a valid flag, a packet size PS, and the like. The request reception unit 210 accepts the memory access request MREQ including the valid flag at a valid level, and does not accept the memory access request MREQ including the valid flag at an invalid level.

The scheduling unit 220 operates in synchronization with a memory clock MCLK, which is a clock to be supplied to the memory 30. Note that the memory clock MCLK is supplied not only to the scheduling unit 220 but also to a clock synchronization circuit in the memory access controller 20. The scheduling unit 220 outputs, together with the request information REQINF, a resource number NXTRSC and a shift signal SFTOUT0 to the request retention pipeline 230 on the basis of a degree of parallelism l, a phase difference m, and an average request interval n set in the setting register 240.

Furthermore, the scheduling unit 220 includes a longest packet size MPS set in the setting register 240 in the request information REQINF and outputs the request information to the request retention pipeline 230. For example, it is assumed that the scheduling unit 220 receives another request information REQINF when the memory access corresponding to the request information REQINF is not executed. In this case, the scheduling unit 220 includes independent request information REQALN indicating that the memory access request has been received independently in the request information REQINF and outputs the request information to the request retention pipeline 230.

The degree of parallelism l indicates a degree of parallelism of memory access, and indicates the number of the processing units 25 (250, 251, and 252) that operate in parallel and control the access of the memory 30. The degree of parallelism l may be changed according to an operating frequency of the memory 30. Hereinafter, the description will be given on the premise that the degree of parallelism of the memory access is "2". The phase difference m indicates a minimum supply interval (the number of cycles of the memory clock MCLK) of the active command ACT to be supplied to the memory 30, and differs depending on the degree of parallelism l (the number of operations of the processing unit 25).

The average request interval n indicates an average supply interval (the number of cycles of the memory clock MCLK) of the active command ACT. The longest packet size MPS indicates the longest packet size PS among the packet sizes PS indicated by the memory access request MREQ supplied to the memory access controller 20, and is set according to a specification of a system in which the CPU 10 and the memory 30 are mounted. The packet size PS indicates the size of the data DQ read from the memory 30 or the number of times of output of the data DQ corresponding to one memory access request MREQ. The longest packet size MPS is an example of a maximum data read size.

Figure 5:
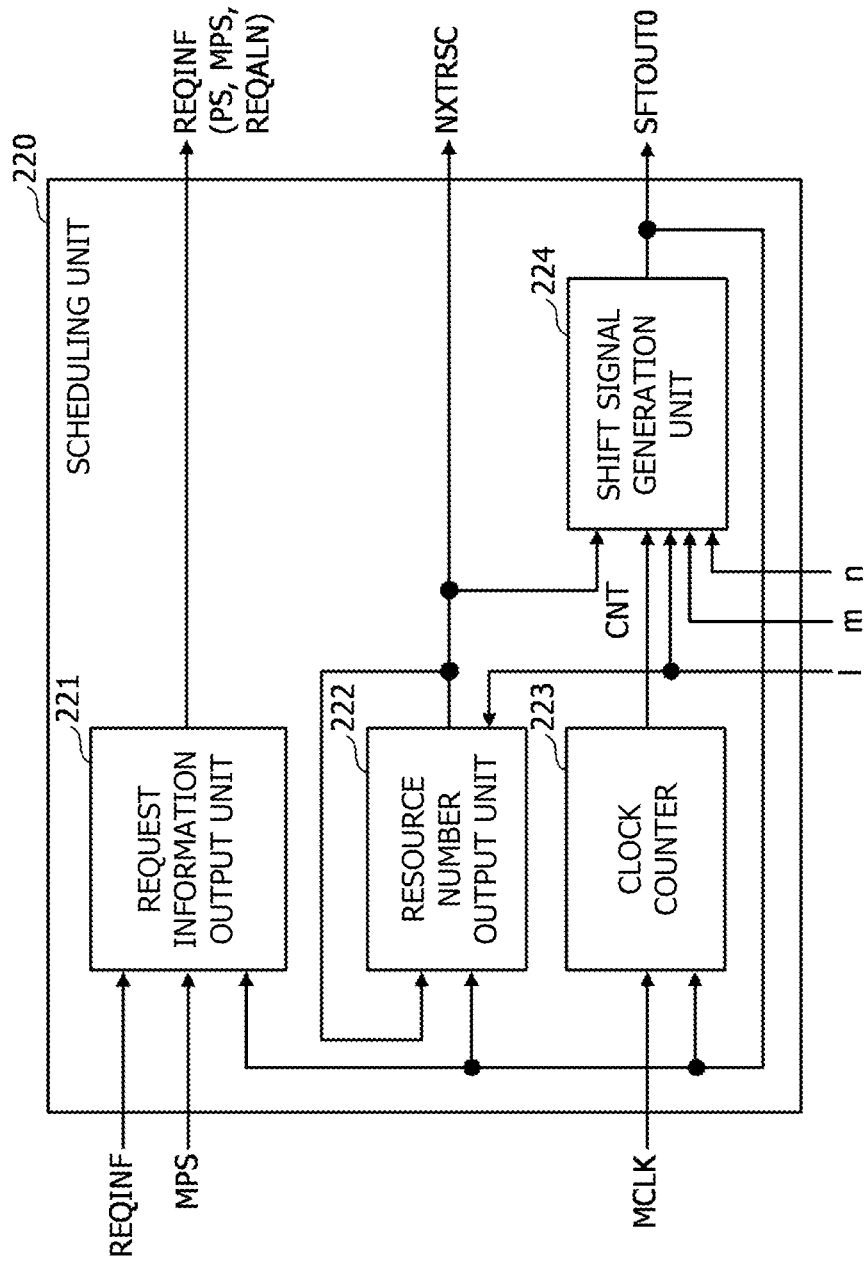
FIG. 5 is a block diagram illustrating an example of a scheduling unit of FIG. 4.
Figure 10:
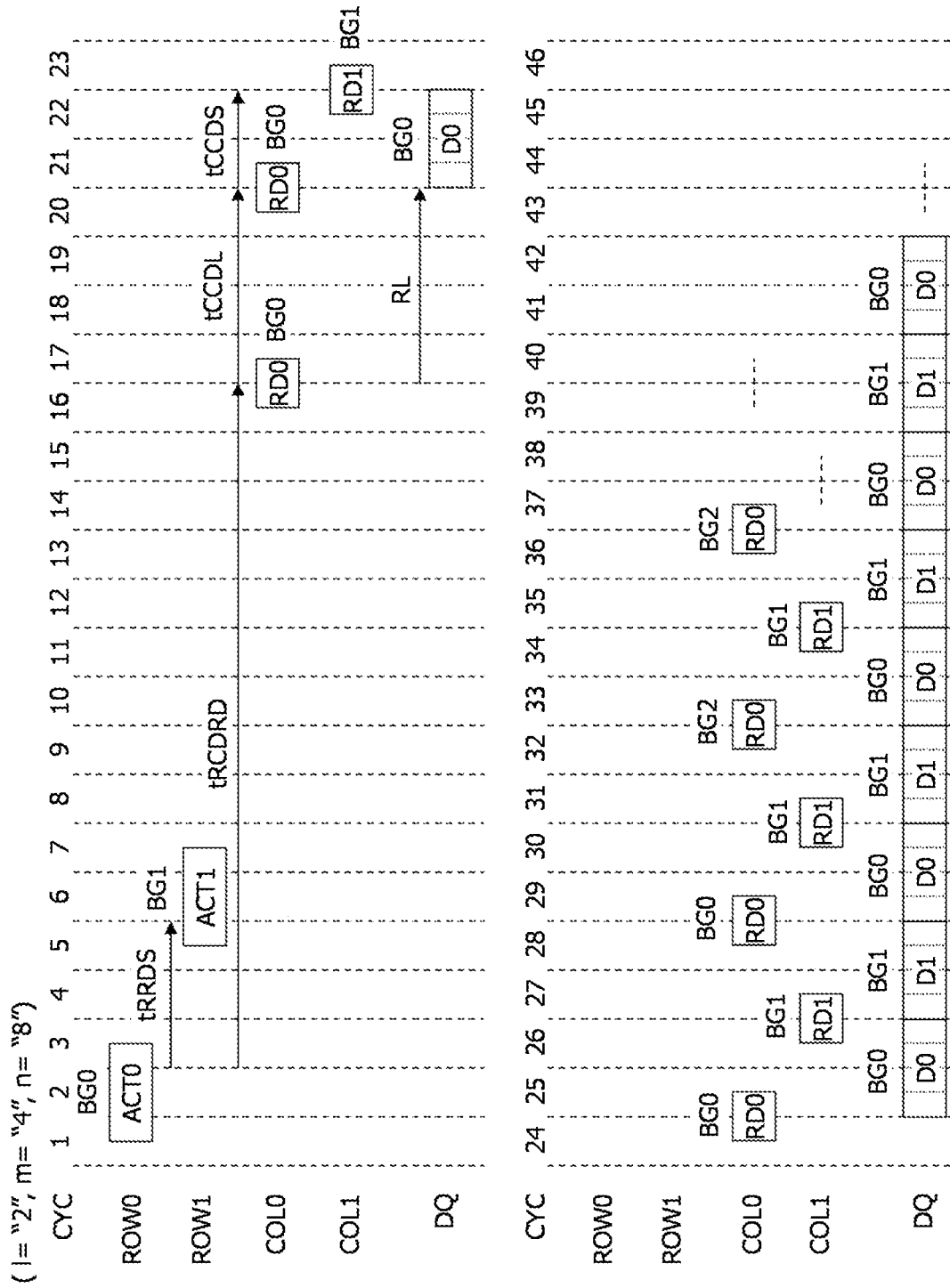
FIG. 10 is a timing chart illustrating an example of read access to a memory using the memory access controller of FIG. 4.

The resource number NXTRSC is a number for identifying the processing unit 25 that generates access commands such as the active command ACT and the read command RD. "0" indicates the processing unit 250, "1" indicates the processing unit 251, and "2" indicates the processing unit 252. An example of the scheduling unit 220 is illustrated in FIG. 5, and examples of the active command ACT and the read command RD are illustrated in FIG. 10 and subsequent drawings. For example, the active command ACT is output to memory 30 to select one of a plurality of word lines contained in memory 30. The read command RD is output to the memory 30 to select a predetermined number of a plurality of memory cells connected to the selected word line.

The request retention pipeline 230 includes a plurality (j+1 in this example) of stages STG (STG0 to STGj) connected in series that operates on the basis of the shift signal SFTOUT0. "j" is an integer greater than or equal to 2, and is, for example, "7". Each stage STG includes a retention area for retaining the resource number NXTRSC (hereinafter also simply referred to as resource number RSC), an elapsed cycle CYC, and the request information REQINF. For example, the elapsed cycle CYC is indicated by the number of clock cycles of the memory clock MCLK. A shift of information between stages STG adjacent to each other is executed in synchronization with a shift input signal SFTIN to be described with reference to FIG. 7.

Figure 7:
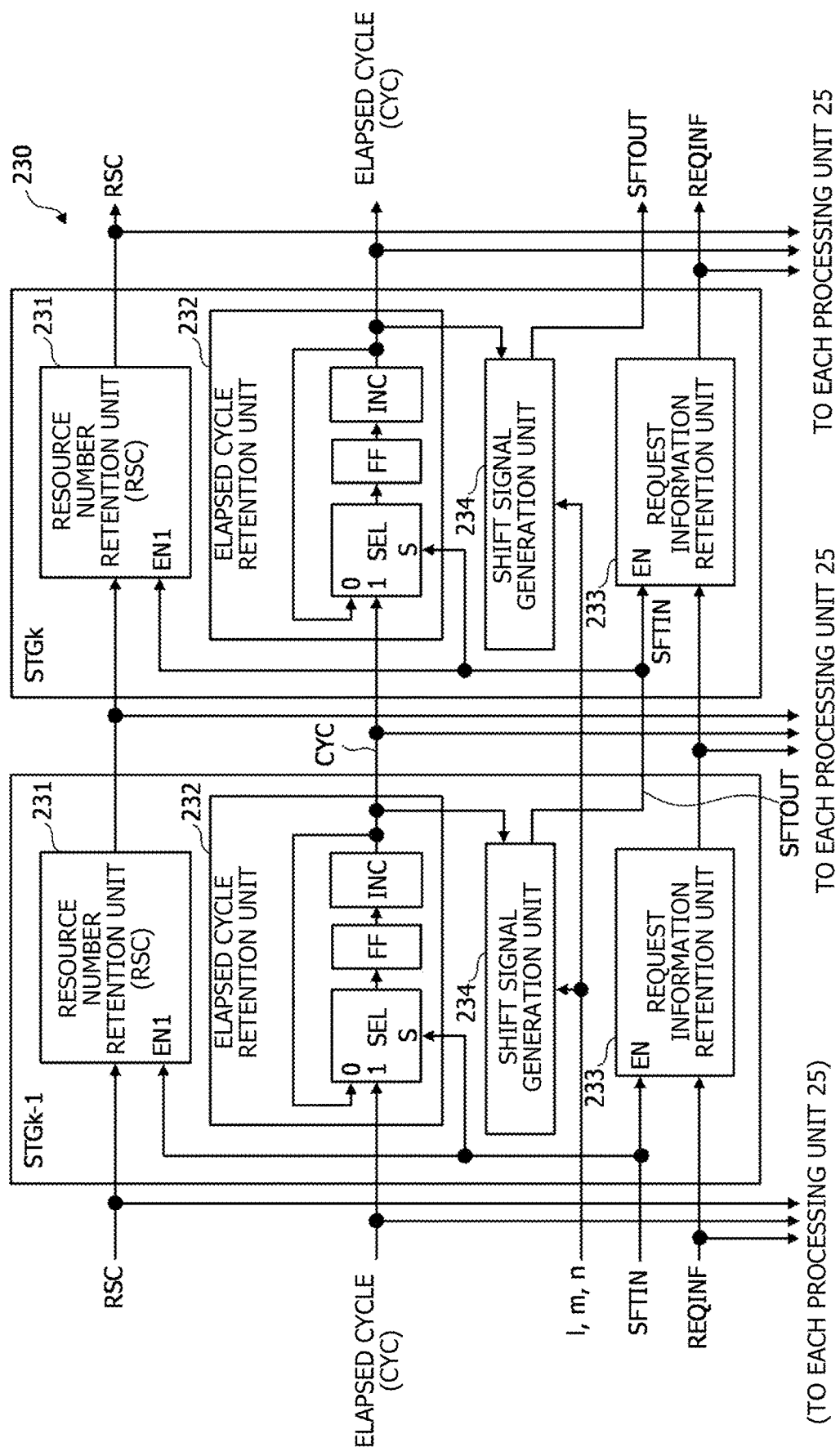
FIG. 7 is a block diagram illustrating an example of a stage of a request retention pipeline of FIG. 4.

The request retention pipeline 230 operates as a shift register that shifts the resource number RSC, the elapsed cycle CYC, and the memory access request REQINF from the first stage STG0 to the subsequent stages STG1 to STGj at timing according to an operation mode. Note that the request retention pipeline 230 is different from a normal shift register in that the period (number of cycles) during which the stage STG retains information changes according to the degree of parallelism l and the resource number RSC. An example of each stage STG of the request retention pipeline 230 is illustrated in FIG. 7.

The setting register 240 includes a register in which each of the degree of parallelism l, the phase difference m, the average request interval n, the longest packet size MPS, row timing TROW, and column timing TCOL is set. For example, the degree of parallelism l, the phase difference m, the average request interval n, the longest packet size MPS, the row timing TROW, and the column timing TCOL are set in the setting register 240 according to the specifications of the memory 30, the CPU 10, and the like. For example, the setting in the setting register 240 is executed by an initialization program of the CPU 10. The degree of parallelism l, the phase difference m, and the average request interval n are supplied to each of the processing units 25 and the scheduling unit 220. The longest packet size MPS is supplied to the scheduling unit 220. The row timing TROW and the column timing TCOL are supplied to each of the processing units 25.

Each of the processing units 25 (250, 251, and 252) outputs a plurality of access commands to the memory 30 on the basis of information including the request information REQINF (memory access request) output from each stage STG of the request retention pipeline 230. The plurality of access commands is output to the memory 30 as a row control signal ROW and a column control signal COL. The row control signal ROW includes the active command ACT, a bank address, and a row address. The column control signal COL includes the read command RD (or write command), a bank address, and a column address.

For example, each of the processing units 25 outputs the row control signal ROW or the column control signal COL, using the request information REQINF, on the basis of the elapsed cycle CYC output by the stage STG that retains the resource number RSC indicating a local processing unit 25. For example, in the case of the degree of parallelism l=2, the processing units 250 and 251 operate, and the processing unit 252 stops operating. In the case of the degree of parallelism l=3, the processing units 250, 251, and 252 operate.

Furthermore, each processing unit 25 includes a data timing control unit 255 that generates the data input timing signal DQIN and the enable signal EN. The data timing control unit 255 generates the data input timing signal DQIN in accordance with timing at which the data DQ is output from the memory 30 corresponding to the read command RD. Furthermore, the data timing control unit 255 generates the enable signal EN on the basis of a fact that the output data DOUT becomes able to be output from the data buffer 290 for each memory access request MREQ. The enable signal EN indicates the output start timing at which the data DQ retained in the data buffer 280 is output to the outside of the memory access controller 20.

Figure 8:
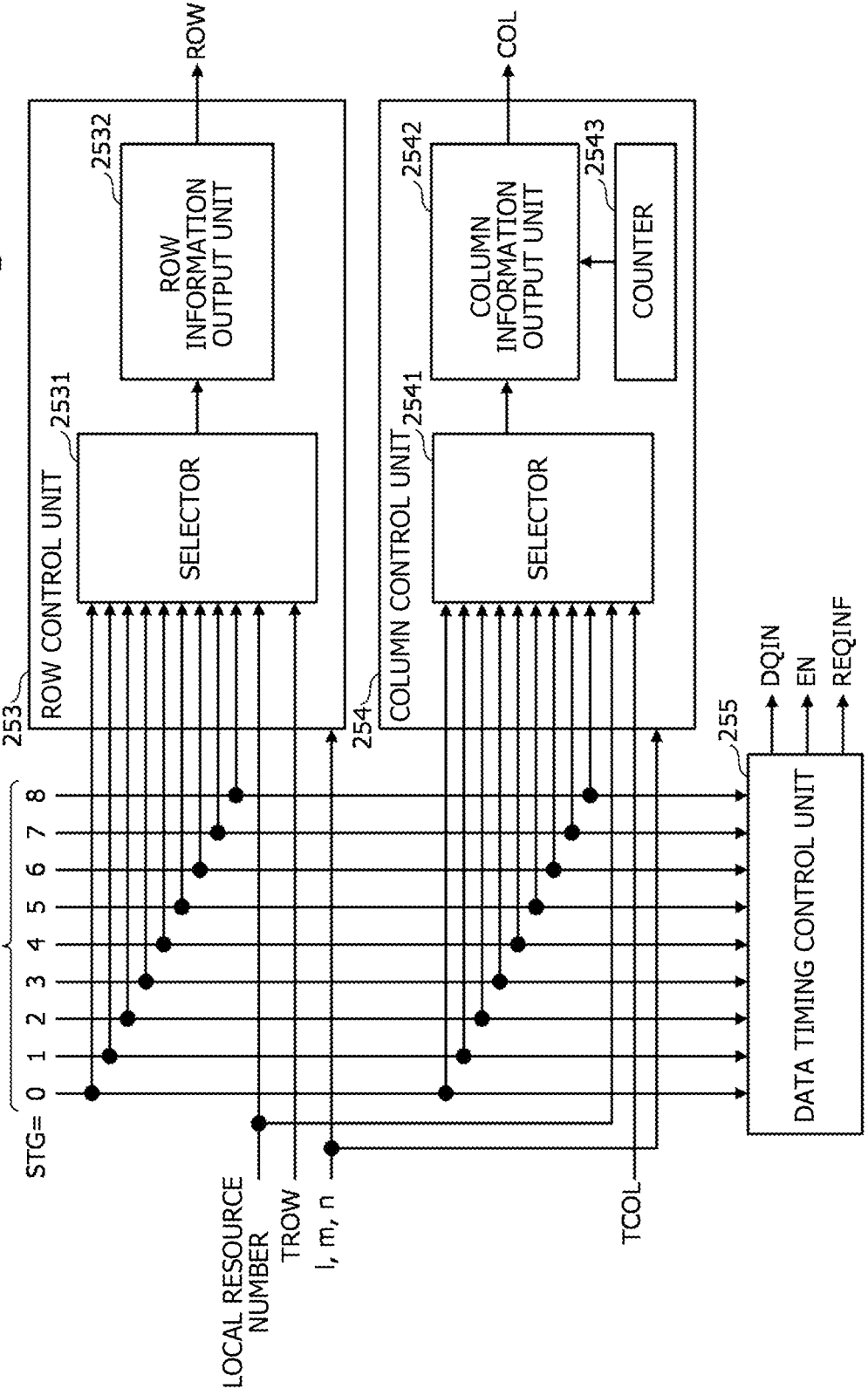
FIG. 8 is a block diagram illustrating an example of a processing unit of FIG. 4.

Moreover, the data timing control unit 255 may output the request information REQINF used for outputting the column control signal COL to the buffer control unit 270. Note that the request information REQINF to be output to the buffer control unit 270 may be output from another element in the processing unit 25. An example of the processing unit 25 is illustrated in FIG. 8.

The selector 260 selects the row control signal ROW and the column control signal COL output by each processing unit 25, and outputs the selected signals to the memory 30. Note that the selector 260 may be designed by a logic of an OR circuit.

Figure 9:
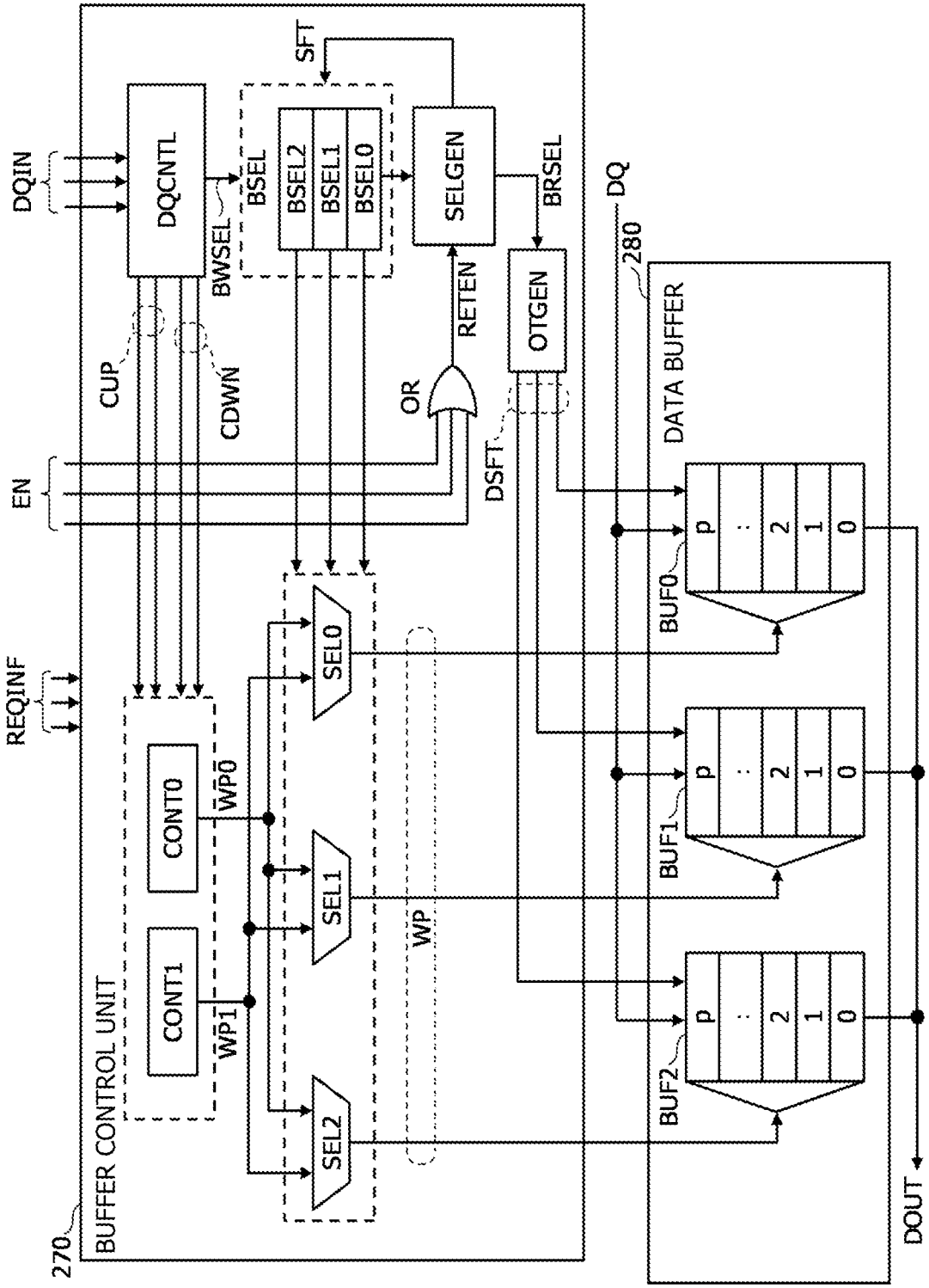
FIG. 9 is a block diagram illustrating an example of a buffer control unit and a data buffer of FIG. 4.

The buffer control unit 270 executes control to store the data DQ read from the memory 30 in the data buffer 280 on the basis of the data input timing signal DQIN. Furthermore, the buffer control unit 270 executes control to output the data DQ retained in the data buffer 280 as the output data DOUT on the basis of the enable signal EN. The data buffer 280 has a plurality of buffers that retains the data DQ read from the memory 30. An example of the buffer control unit 270 and the data buffer 280 is illustrated in FIG. 9.

FIG. 5 illustrates an example of the scheduling unit 220 of FIG. 4. The scheduling unit 220 includes a request information output unit 221, a resource number output unit 222, a clock counter 223, and a shift signal generation unit 224.

The request information output unit 221 sequentially retains the request information REQINF received from the request reception unit 210 and the longest packet size MPS retained in the setting register 240. The request information output unit 221 sequentially outputs the retained information and the independent request information REQALN as the request information REQINF to the request retention pipeline 230 in synchronization with the shift signal SFTOUT0.

The resource number output unit 222 sequentially generates and outputs the resource number NXTRSC indicating the processing unit 25 (250, 251, or 252) that generates the access command to be output to the memory 30 using the request information REQINF. In the case of the degree of parallelism l=2, the resource number output unit 222 alternately outputs "0" and "1" indicating the processing units 250 and 251, for example, as the resource number NXTRSC in synchronization with the shift signal SFTOUT0. In the case of the degree of parallelism l=3, the resource number output unit 222 alternately outputs "0", "1", and "2" indicating the processing units 250, 251, and 252 as the resource number NXTRSC in synchronization with the shift signal SFTOUT0.

Thereby, it becomes possible to operate the resource number output unit 222 as a counter that alternately generates the resource numbers NXTRSC with the "degree of parallelism l−1" set as a maximum value, and it becomes possible to differentiate the total number of the resource numbers NXTRSC according to the degree of parallelism l (operation mode). Since the resource numbers NXTRSC can be alternately output according to the degree of parallelism l, it is possible to operate the request retention pipeline 230 regardless of the setting of the degree of parallelism l. As a result, the memory access controller 20 can output the access command to the memory 30 at timing according to the degree of parallelism l.

The clock counter 223 generates a counter value CNT in synchronization with the memory clock MCLK, and outputs the generated counter value CNT to the shift signal generation unit 224. For example, the clock counter 223 increments the counter value CNT in synchronization with the memory clock MCLK while no shift signal SFTOUT0 is output. Furthermore, the clock counter 223 resets the counter value CNT to "1" in response to the output of the shift signal SFTOUT0.

The shift signal generation unit 224 generates and outputs the shift signal SFTOUT0 at time intervals determined on the basis of the resource number NXTRSC, the counter value CNT, the degree of parallelism l, the phase difference m, and the average request interval n.

In the case of the degree of parallelism l=2 and the resource number NXTRSC=0, the shift signal generation unit 224 outputs the shift signal SFTOUT0 when the counter value CNT=m. In the case of the degree of parallelism l=2 and the resource number NXTRSC=1, the shift signal generation unit 224 outputs the shift signal SFTOUT0 when the counter value CNT="2n−m". In a case of the degree of parallelism l=3, the shift signal generation unit 224 outputs the shift signal SFTOUT0 every time the counter value CNT becomes "n".

Figure 6:
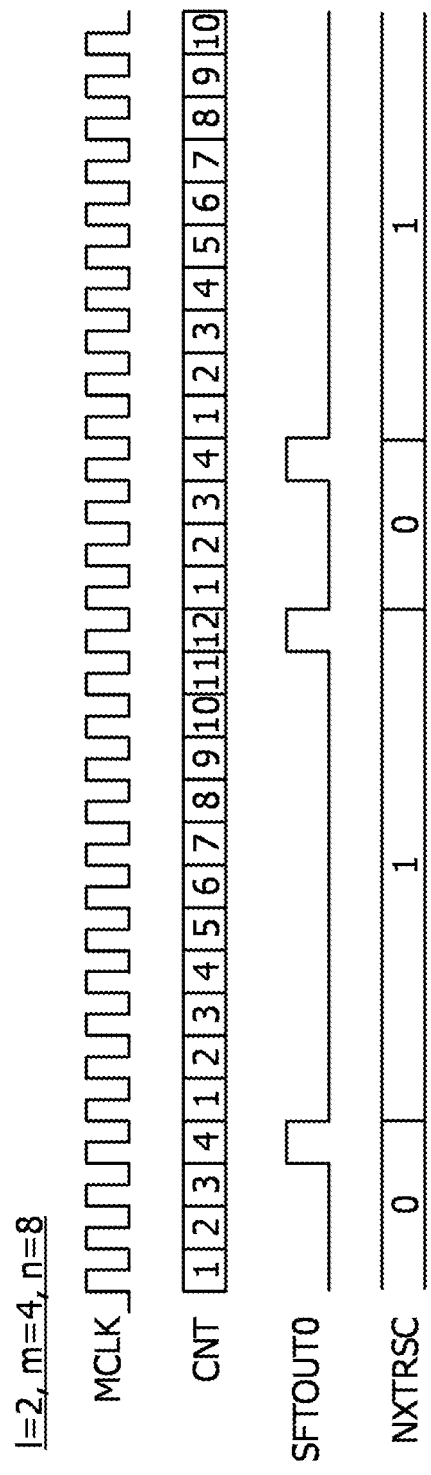
FIG. 6 is a timing chart illustrating example of an operation of the scheduling unit of FIG. 5.

FIG. 6 illustrates an example of the operation of the scheduling unit 220 of FIG. 5. FIG. 6 illustrates an example of the degree of parallelism l=2, the phase difference m=4, and the average request interval n=8.

In the case of the degree of parallelism l=2, the scheduling unit 220 outputs the shift signal SFTOUT0 on the basis of a fact that the clock counter 223 has counted "4" when the resource number NXTRSC=0. Furthermore, in the case of the degree of parallelism l=2, the scheduling unit 220 outputs the shift signal SFTOUT0 on the basis of the fact that the clock counter 223 has counted "12" when the resource number NXTRSC=1.

The scheduling unit 220 can change the maximum value of the counter value CNT on the basis of the degree of parallelism l, the phase difference m, and the average request interval n set according to the specification of the memory 30 connected to the CPU 10, and the current resource number NXTRSC. Then, the scheduling unit 220 can output the shift signal SFTOUT0 at desired timing on the basis of the counter value CNT whose maximum value is variable, and can update the resource number NXTRSC in accordance with the output of the shift signal SFTOUT0.

FIG. 7 illustrates an example of the stages STG of the request retention pipeline 230 of FIG. 4. Since the configurations of respective stages STG are the same as each other, FIG. 7 illustrates two stages ((k−1)-th stage and k-th stage (k is an integer of 1 or more and 8 or less)). Each stage STG includes a resource number retention unit 231, an elapsed cycle retention unit 232, a request information retention unit 233, and a shift signal generation unit 234.

Note that the first stage STG0 receives the resource number RSC, the request information REQINF, and the shift signal SFTOUT0 output from the scheduling unit 220 of FIG. 5. The stage STG0 receives the shift signal SFTOUT0 from the scheduling unit 220 as the shift input signal SFTIN. The elapsed cycle CYC supplied to the stage STG0 is an elapsed cycle integrated with reference to the time (="0") when the request information REQINF is received from the scheduling unit 220, and is generated by a clock counter (not illustrated). Furthermore, information input to the first stage STG0 is not supplied to each processing unit 25.

While receiving the shift input signal SFTIN at a valid level (for example, high level) with the enable terminal EN1, the resource number retention unit 231 captures and retains the resource number RSC from the previous stage, and outputs the retained resource number RSC to the subsequent stage STG and each processing unit 25. The second and subsequent stages STG operate by receiving, as the shift input signal SFTIN, the shift signal SFTOUT0 output by the previous stage STG. Note that the resource number retention unit 231 of the first stage STG0 sequentially receives the resource number NXTRSC (repetition of "0" and "1" in the case of the degree of parallelism l=2) output by the resource number output unit 222 of the scheduling unit 220 of FIG. 5.

The elapsed cycle retention unit 232 includes a selector SEL, a flip-flop FF, and an incrementor INC. The selector SEL selects the elapsed cycle CYC from the previous stage while the shift input signal SFTIN is at the high level, and selects the elapsed cycle CYC from the incrementor INC while the shift input signal SFTIN is at a low level. Then, the selector SEL outputs the selected elapsed cycle CYC to the flip-flop FF.

The flip-flop FF captures the elapsed cycle CYC received from the selector SEL in synchronization with the memory clock MCLK (not illustrated), and outputs the captured elapsed cycle CYC to the incrementor INC. The incrementor INC increases the elapsed cycle CYC by "1", returns the increased elapsed cycle CYC to the input of the selector SEL, and outputs the elapsed cycle to the next stage STG and each processing unit 25.

The elapsed cycle retention unit 232 of each of the second and subsequent stages STG1 to STG8 retains the elapsed cycle CYC (number of cycles) retained by the elapsed cycle retention unit 232 of the previous stage STG in synchronization with the shift signal SFTOUT output by the previous stage STG. Furthermore, the elapsed cycle retention unit 232 of each of the stages STG1 to STGj sequentially updates the retained number of cycles while the previous stage STG outputs no shift signal SFTOUT. Accordingly, the elapsed cycle retention unit 232 of each stage STG can retain the number of cycles since reception of the request information REQINF in the first stage STG0, and can output the retained number of cycles to each processing unit 25. As a result, each processing unit 25 can determine the output timing of the access command to the memory 30 on the basis of the number of cycles from each stage STG.

The shift signal generation unit 234 generates the shift signal SFTOUT on the basis of the degree of parallelism l, the phase difference m, the average request interval n, and the elapsed cycle CYC output by the elapsed cycle retention unit 232. The shift signal SFTOUT generated by the shift signal generation unit 234 is supplied to the next stage STG as the shift input signal SFTIN. In this manner, in a case where the elapsed cycle CYC becomes a value determined on the basis of the degree of parallelism l, the phase difference m, the average request interval n, and the position (=k) of its own stage STG, the shift signal generation unit 234 of each stage STG outputs the shift signal SFTOUT.

In a case of the degree of parallelism l=2 and the resource number RSC of "0" that is retained by the resource number retention unit 231, the shift signal generation unit 234 sets the shift signal SFTOUT to the valid level (for example, high level) for the period of one cycle when the elapsed time is "k*n+m". The sign "*" indicates the product. In a case where the degree of parallelism l=2 and the resource number RSC of "1" that is retained by the resource number retention unit 231, the shift signal generation unit 234 sets the shift signal SFTOUT to the valid level for the period of one cycle when the elapsed time is "(k+1)*n". In a case where the degree of parallelism l=3, the shift signal generation unit 234 sets the shift signal SFTOUT to the valid level for the period of one cycle when the elapsed time is "(k+1)*n".

For example, the shift signal generation unit 234 can change the output timing of the shift signal SFTOUT according to the degree of parallelism l, the phase difference m, the average request interval n set in advance according to the specification of the memory 30, and the current resource number NXTRSC. As a result, it is possible to align the output timing of the shift signal SFTOUT of each stage STG and to suppress a malfunction of the request retention pipeline 230 even in a case where the supply interval of the active command ACT is not a fixed interval.

For example, it is assumed that the degree of parallelism l=2, the phase difference m=4, and the average request interval n=8 are set. In this case, the first stage STG0 retaining the resource number RSC=0 outputs the shift signal SFTOUT four cycles after the reception of the request information REQINF. The second stage STG1 retaining the resource number RSC=0 outputs the shift signal SFTOUT twelve cycles after the reception of the request information REQINF. The third stage STG2 retaining the resource number RSC=0 outputs the shift signal SFTOUT twenty cycles after the reception of the request information REQINF.

Furthermore, the first stage STG0 retaining the resource number RSC=1 outputs the shift signal SFTOUT eight cycles after the reception of the request information REQINF. The second stage STG1 retaining the resource number RSC=1 outputs the shift signal SFTOUT sixteen cycles after the reception of the request information REQINF. The third stage STG2 retaining the resource number RSC=1 outputs the shift signal SFTOUT twenty-four cycles after the reception of the request information REQINF.

Meanwhile, it is assumed that the degree of parallelism l=3, the phase difference m=8, and the average request interval n=8 are set. In this case, the first stage STG0 outputs the shift signal SFTOUT eight cycles after the reception of the request information REQINF. The second stage STG1 outputs the shift signal SFTOUT sixteen cycles after the reception of the request information REQINF. The third stage STG2 outputs the shift signal SFTOUT twenty-four cycles after the reception of the request information REQINF.

The request information retention unit 233 captures and retains the request information REQINF from the previous stage while receiving the shift input signal SFTIN at the valid level with the enable terminal EN1. The request information retention unit 233 outputs the captured request information REQINF to the next stage STG and each processing unit 25. The request information retention unit 233 of the first stage STG0 captures the request information REQINF output by the request information output unit 221 of the scheduling unit 220.

FIG. 8 illustrates an example of the processing unit 25 (250, 251, or 252) of FIG. 4. In FIG. 8, it is assumed that the request retention pipeline 230 has nine stages STG0 to STG8. Each processing unit 25 includes a row control unit 253 having a selector 2531 and a row information output unit 2532, and a column control unit 254 having a selector 2541, a column information output unit 2542, and a counter 2543, in addition to the data timing control unit 255.

The selector 2531 receives the resource number RSC, the elapsed cycle CYC, and the request information REQINF from each of the stages STG0 to STG8 of the request retention pipeline 230. Furthermore, the selector 2531 receives the row timing TROW and the degree of parallelism l from the setting register 240.

The selector 2531 selects the request information REQINF output from the stage STG that outputs the resource number RSC that matches the local resource number, which is an identification number of the local processing unit 25, and the elapsed cycle CYC that matches the cycle indicated by the row timing TROW. Then, the selector 2531 outputs the selected request information REQINF to the row information output unit 2532. The row information output unit 2532 responds to the request information REQINF received from the selector 2531, generates a row control signal ROW using the request information REQINF, and outputs the row control signal to the memory 30.

The selector 2541 receives the resource number RSC, the elapsed cycle CYC, and the request information REQINF from each of the stages STG0 to STG8 of the request retention pipeline 230. Furthermore, the selector 2541 receives the column timing TCOL and the degree of parallelism l from the setting register 240.

The selector 2541 selects the request information REQINF output from the stage STG that outputs the resource number RSC that matches the local resource number, which is an identification number of the local processing unit 25, and the elapsed cycle CYC that matches the cycle indicated by the column timing TCOL. Then, the selector 2541 outputs the selected request information REQINF to the column information output unit 2542. The counter 2543 counts the number of times of output of the column control signal COL. The column information output unit 2542 responds to the request information REQINF received from the selector 2541, generates the column control signal COL using the request information REQINF, and outputs the column control signal to the memory 30. At this time, the column information output unit 2542 outputs the column control signal COL of the number of times counted by the counter 2543 every time a predetermined number of cycles have elapsed.

In this manner, each processing unit 25 receives the resource number RSC, the elapsed cycle CYC, and the request information REQINF retained by the plurality of stages STG of the request retention pipeline 230. Then, in a case where the received resource number RSC matches the local resource number, each processing unit 25 outputs the access command (active command ACT, read command RD, or the like) corresponding to the received request information REQINF to the memory 30. For example, in a case where the number of cycles indicated by the elapsed cycle CYC retained by the stage STG that outputs the local resource number RSC indicates the output cycle of the access command determined according to the degree of parallelism l, each processing unit 25 outputs the corresponding access command to the memory 30. Therefore, even in a case where the output cycle of the access command is changed depending on the degree of parallelism l, the access command can be output to the memory 30 at the correct timing on the basis of the degree of parallelism l, the resource number RSC, and the elapsed cycle CYC.

The data timing control unit 255 receives the request information REQINF output from the stage STG that outputs the resource number RSC that matches the local resource number, and the elapsed cycle CYC that matches the cycle indicated by the column timing TCOL. The request information REQINF includes the independent request information REQALN. The data timing control unit 255 generates the data input timing signal DQIN and the enable signal EN on the basis of the received information. Furthermore, the data timing control unit 255 outputs the request information REQINF used for outputting the column control signal COL, as described with reference to FIG. 4.

Note that the data input timing signal DQIN and the enable signal EN may include identification information for identifying which memory access request MREQ (read access request) corresponds to. In this case, the identification information may be a sequence number. The generation timing of the write pointer value WP and the generation timing of the enable signal EN based on the data input timing signal DQIN will be described with reference to FIGS. 13 and 15 and the like.

Furthermore, the memory access controller 20 controls access to the memory 30 on the basis of the degree of parallelism l, the phase difference m, and the average request interval n set in the setting register 240. For example, the degree of parallelism l is "2" or "3". Since the degree of parallelism l, the phase difference m, and the average request interval n are variable, a control circuit for memory access becomes complicated as illustrated in FIGS. 5, 7, and 8. However, the control circuit illustrated in FIGS. 5, 7 and 8 is an example, and the memory access controller 20 may have another control circuit. For example, in the case where it is limited to the degree of parallelism l=2, the phase difference m=4, and the average request interval n=8, the output timing of the shift signal SFTOUT0 is fixed as illustrated in FIG. 6. Therefore, the control circuit for memory access can be simplified as compared with FIGS. 5, 7, and 8.

Note that an example of the timing of the active command ACT and the read command RD issued by the memory access controller 20 to the memory 30 is illustrated in FIGS. 9 to 17 of Japanese Patent. Application No. 2020-097826.

FIG. 9 illustrates an example of the buffer control unit 270 and the data buffer 280 of FIG. 4. An example of operations of the buffer control unit 270 and the data buffer 280 will be described with reference to FIGS. 11 to 18. The buffer control unit 270 has a data output control unit DQCNTL, a buffer selector BSEL, counters CONT (CONT0 and CONT1), and selectors SEL (SEL0, SEL1, and SEL2). Furthermore, the buffer control unit 270 has an OR circuit OR, a selection signal generation unit SELGEN, and an output timing generation unit OTGEN.

The data buffer 280 has buffers BUF (BUF0, BUF1, and BUF2). Each of the buffers BUF0 to BUF2 has p+1 entries retaining the data DQ read from memory 30 and writes the data DQ to the entry specified by the write pointer value WP. Each of the buffers BUF0 to BUF2 has a shift register structure. In this example, "p" is an integer greater than or equal to "3".

The data output control unit DQCNTL outputs a write selection signal BWSEL indicating one of the buffers BUF0 to BUF2 to the buffer selector BSEL in response to the data input timing signal DQIN from the data timing control unit 255 of each processing unit 25. Furthermore, the data output control unit DQCNTL outputs a count-up signal CUP to either the counter CONT0 or CONT1 in response to the data input timing signal DQIN. Moreover, the data output control unit DQCNTL outputs a countdown signal CDWN to the counter CONT0 (or CONT1) according to a predetermined condition set in advance. The data output control unit DQCNTL is an example of a counter control unit that counts up or counts down each of the counters CONT0 and CONT1.

The predetermined condition is a case in which the output of the data DQ retained in the buffer BUF starts before the write pointer value WP0 (or WP1) of the counter CONT0 (or CONT1) reaches the maximum value corresponding to the packet size PS. For example, the data output control unit DQCNTL may determine the timing to generate the countdown signal CDWN on the basis of the request information REQINF received from the data timing control unit 255 in FIG. 8.

The data output control unit DQCNTL counts down the counter CONT when outputting the data DQ from the buffer BUF with respect to the buffer BUF having the structure of the shift register. Thereby, even if a storage position of the new data DQ shifts due to the shift operation of the buffer BUF, the data DQ can be stored in the correct position.

Furthermore, the data output control unit DQCNTL stops the count-up and countdown of the counter CONT when storing the data DQ in the buffer BUF and outputting the data DQ from the buffer BUF at the same time. Thereby, it is possible to store the new data DQ at the same position in the buffer BUF regardless of the shift operation of the buffer BUF. For example, it is possible to store the new data DQ at the correct position even when storing the data DQ in the buffer BUF and outputting the data DQ from the buffer BUF at the same time.

Note that the data output control unit DQCNTL outputs the write selection signal BWSEL of "0" when receiving the data input timing signal DQIN in an idle state in which the access to the memory 30 is not executed. Furthermore, the data output control unit DQCNTL outputs the count-up signal CUP to the counter CONT0 in the idle state. After that, when the data output control unit DQCNTL outputs the count-up signal CUP to the counter CONT1 when receiving the data input timing signal DQIN corresponding to the different memory access request MREQ.

The data output control unit. DQCNTL can determine the idle state on the basis of the independent request information REQALN, which is included in the request information REQINF and indicates that the memory access request. MREQ has been received independently. Furthermore, the data output control unit DQCNTL can determine that it is not the idle state in a case where the request information REQINF does not include the independent request information REQALN.

The data output control unit DQCNTL outputs a predetermined number (for example, "4") of the count-up signal CUP to the same counter CONT every time receiving the data input timing signal DQIN corresponding to the same memory access request MREQ. Furthermore, the data output control unit DQCNTL switches the counter CONT that outputs the count-up signal CUP in order to alternately use the counters CONT0 and CONT1 every time the processing unit 25 as an output source of the data input timing signal DQIN changes.

The buffer selector BSEL has three retention units BSEL0, BSEL1, and BSEL2 each retaining a buffer selection value for identifying the buffer BUF to be selected. The buffer selection values retained in the retention units BSEL0 to BSEL2 are output to the selectors SEL0 to SEL2 in response to the data input timing signal DQIN from the data timing control unit 255 of each processing unit 25. Hereinafter, the buffer selection value retained in each of the retention units BSEL0 to BSEL2 is also referred to as buffer selection values BSEL0 to BSEL2.

The buffer selector BSEL preferentially uses the retention units BSEL0, BSEL1, and BSEL2 in ascending order. For example, in a case of receiving the write selection signal BWSEL of "0" in the idle state, the buffer selector BSEL retains the received "0" in the retention unit BSEL0 having the highest priority. In a case of receiving the write selection signal BWSEL of "1" in this state, the buffer selector BSEL retains the received "1" in the retention unit BSEL1 having the next highest priority. In a case of further receiving the write selection signal BWSEL of "2" in this state, the buffer selector BSEL retains the received "2" in the retention unit BSEL2 having the lowest priority.

The buffer selector BSEL outputs the buffer selection value retained in the retention unit BSEL0 to the selection signal generation unit SELGEN. Then, the buffer selector BSEL moves the buffer selection value retained in each of the retention units BSEL1 and BSEL2 to the retention units BSEL0 and BSEL1 having one lower priority on the basis of the shift signal SFT.

The counter CONT0 increases the write pointer value WP0 by "1" at a time in response to the count-up signal CUP and decreases the write pointer value WP0 by "1" at a time in response to the countdown signal CDWN. The counter CONT1 increases the write pointer value WP1 by "1" at a time in response to the count-up signal CUP and decreases the write pointer value WP1 by "1" at a time in response to the countdown signal CDWN.

The selectors SEL0 to SEL2 are arranged between the counters CONT0 and CONT1 and the buffers BUF0 to BU2. The selector SEL0 outputs either the write pointer value WP0 or WP1 to the buffer BUF0 as the write pointer value WP on the basis of the output of the write selection signal BWSEL of "0" from the data output control unit. DQCNTL. The selector SEL1 outputs either the write pointer value WP0 or WP1 to the buffer BUF1 as the write pointer value WP on the basis of the output of the write selection signal BWSEL of "1" from the data output control unit. DQCNTL.

The selector SEL2 outputs either the write pointer value WP0 or WP1 to the buffer BUF2 as the write pointer value WP on the basis of the output of the write selection signal BWSEL of "2" from the data output control unit DQCNTL. As described above, after the counter CONT0 is used in the idle state, the counters CONT1 and CONT0 are alternately used every time the processing unit 25 as the output source of the data input timing signal DQIN changes. Then, each selector SEL continues to select the initially selected write pointer value WP until the corresponding buffer BUF stores the number of data DQ corresponding to the packet size PS included in the memory access request MREQ. For example, each selector SEL detects the packet size PS on the basis of the request information REQINF.

By arranging the selectors SEL0 to SEL2 between the counters CONT0 and CONT1 and the buffers BUF0 and BUF2, the write pointer value WP generated by any counter CONT can be supplied to any buffer BUF. As a result, the number of counters CONT can be made smaller than the number of buffers BUF, and the circuit scale of the memory access controller 20 can be reduced as compared with a case where the same number of counters CONT as the number of buffers BUF is provided.

The OR circuit OR outputs the enable signal EN from the data timing control unit 255 of each processing unit 25 to the selection signal generation unit SELGEN as a response enable signal RETEN. The selection signal generation unit SELGEN outputs the buffer selection value retained by the retention unit BSEL0 when receiving the response enable signal RETEN to the output timing generation unit OTGEN as a read selection signal BRSEL. The read selection signal BRSEL indicates the buffer BUF that retains the data DQ read from the memory 30, corresponding to the memory access request MREQ.

The output timing generation unit OTGEN decodes the read selection signal BRSEL from the selection signal generation unit SELGEN and selects the buffer BUF indicated by the value of the read selection signal BRSEL. The output timing generation unit OTGEN outputs the data shift signal DSFT to the selected buffer BUF. Here, the output timing generation unit OTGEN continuously outputs the data shift signal DSFT having pulses corresponding to the number of data indicated by the packet size PS included in the memory access request MREQ. Note that, in a case where the memory 30 is a DDR type, the pulse of the data shift signal DSFT is output twice in one cycle of the memory clock MCLK.

Each of the buffers BUF0 to BUF2 shifts the data DQ retained in the entry with a high numerical value to the entry with a low numerical value in response to the shift signal DSFT. Then, each of the buffers BUF0 to BUF2 outputs the data DQ taken out from the entry "0" as the output data DOUT to the common output data, line DOUT. Note that the buffer control unit 270 generates the shift signal DSFT so that the output data DOUT output from the buffers BUF0 to BUF2 do not collide on the output data line DOUT.

FIG. 10 illustrates an example of read access to the memory 30 using the memory access controller 20 of FIG. 4. FIG. 10 illustrates an example of an operation in the case where the degree of parallelism l=2, the phase difference m=4, and the average request interval n=8 are set. A row control signal ROW0 and a column control signal COL0 are output from the processing unit 250, and a row control signal ROW1 and a column control signal COL1 are output from the processing unit 251. The memory 30 is assumed to have two bank groups BG0 and BG1. In FIG. 10, the sequentially increasing numerical value indicates the elapsed cycle CYC (an integrated value of the number of cycles of the memory clock MCLK).

First, in CYC1, the processing unit 250 outputs the active command ACT0 to the bank group BG0. For example, the active command ACT is supplied to the memory 30 using two clock cycles. In CYC5, which is RAS to RAS Delay (tRRDS) after the processing unit 250 outputs the active command ACT0, the processing unit 251 outputs the active command ACT1 to the bank group BG1. The "tRRDS" is a specification of the minimum interval between active commands ACT between different bank groups BGs.

In CYC16, which is RAS to CAS Delay (tRCDRD) after the output of the active command ACID, the processing unit 250 outputs the first read command RD0 to the bank group BG0. In CYC20, which is CAS to CAS Delay Long (tCCDL) after the output of the read command RD0, the processing unit 250 outputs the second read command RD0 to the bank group BG0. The "tCCDL" is a specification of the minimum interval between column commands (read commands RD or the like) in the same bank group BG.

In CYC22, which is CAS to CAS Delay Short (tCCDS) after the processing unit 250 outputs the read command RD0, the processing unit 251 outputs the first read command RD1 to the bank group BG1. The "tCCDS" is a specification of the minimum interval between column commands between different bank groups BGs.

Thereafter, the processing units 250 and 251 alternately output the read command RD (RD0 or RD1) every two cycles. The output interval of the read commands RD by the respective processing units 250 and 251 is four cycles.

After the cycles corresponding to read latency RL from when the processing unit 250 outputs the first read command RD0, the first read data D0 corresponding to the first read command RD0 is output from the bank group BG0. In this example, since the burst length is set to "4", four data are read in synchronization with each of the rising edge and falling edge of the memory clock MCLK. Moreover, after the read latency RL has elapsed from each read command RD, the read data D (D0 or D1) is respectively read from each bank group BG.

The operation illustrated in FIG. 10 is implemented by the scheduling unit 220 that outputs the shift signal SFTOUT0 and the request retention pipeline 230 that executes the shift operation of the stage STG according to the degree of parallelism l=2, the phase difference m=4, and the average request interval n=8. Accordingly, the memory access controller 20 can execute the read access operation with the degree of parallelism l=2 using the information sequentially transferred to the stage STG of the request retention pipeline 230 common to a plurality of degrees of parallelism l.

FIGS. 11 to 18 illustrate an example of the operations of the buffer control unit 270 and the data buffer 280 at the time of read access to the memory 30. For example, FIGS. 11 to 18 illustrate an example of a memory access method by the memory access controller 20. Detailed description of operations similar to those in FIG. 10 is omitted.

The operations illustrated in FIGS. 11 to 18 are executed with the setting of the degree of parallelism l=2, the phase difference m=4, and the average request interval n=8, similar to FIG. 10. The longest packet size MPS is set to "32", where the data DQ is read thirty-two times from the memory 30 in response to one memory access request MREQ.

Figure 11:
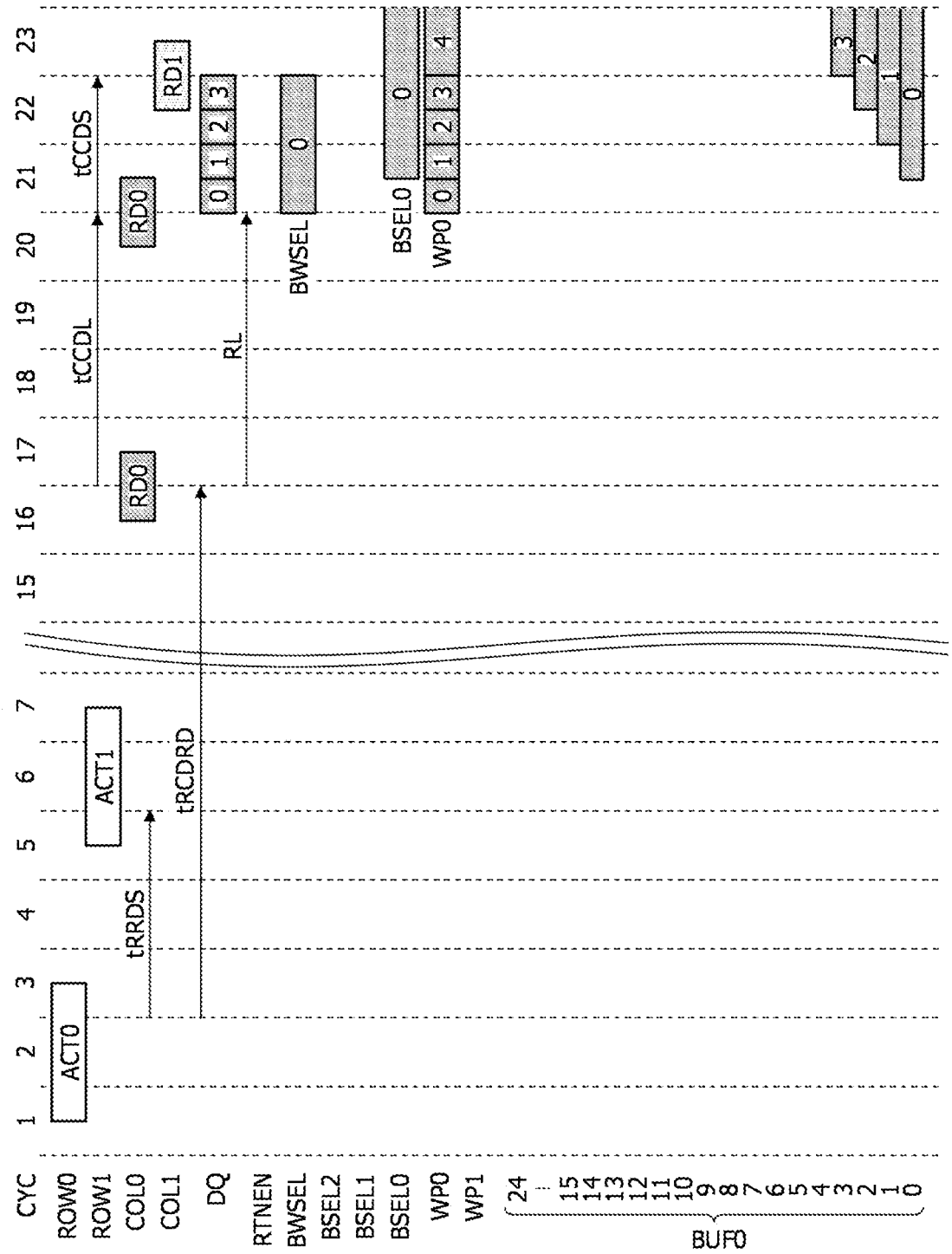
FIG. 11 is a timing chart illustrating an example of an operation of the buffer control unit and the data buffer at the time of read access to the memory.
Figure 12:
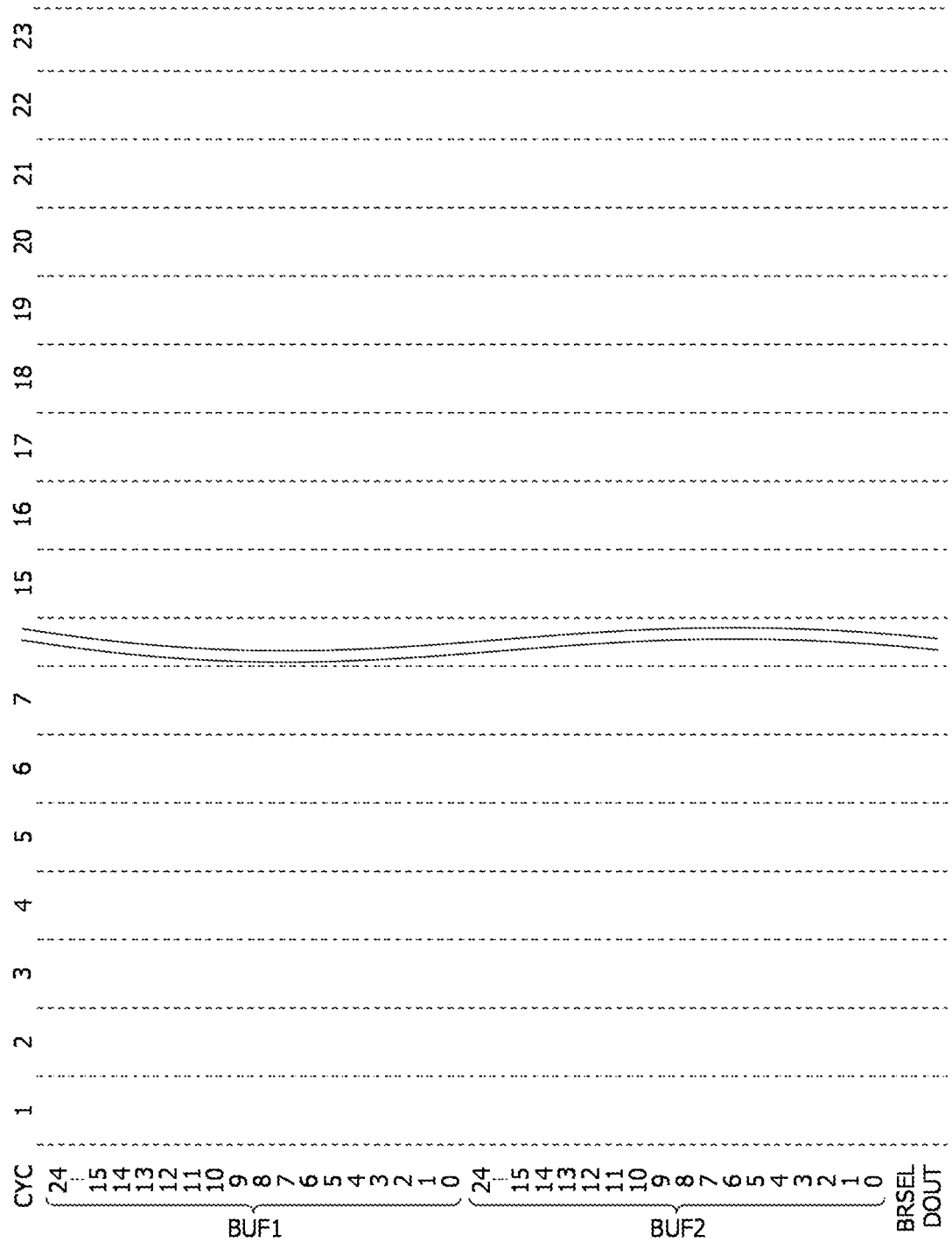
FIG. 12 is a timing chart illustrating an example of an operation of the memory access controller in the same period as FIG. 11.
Figure 13:
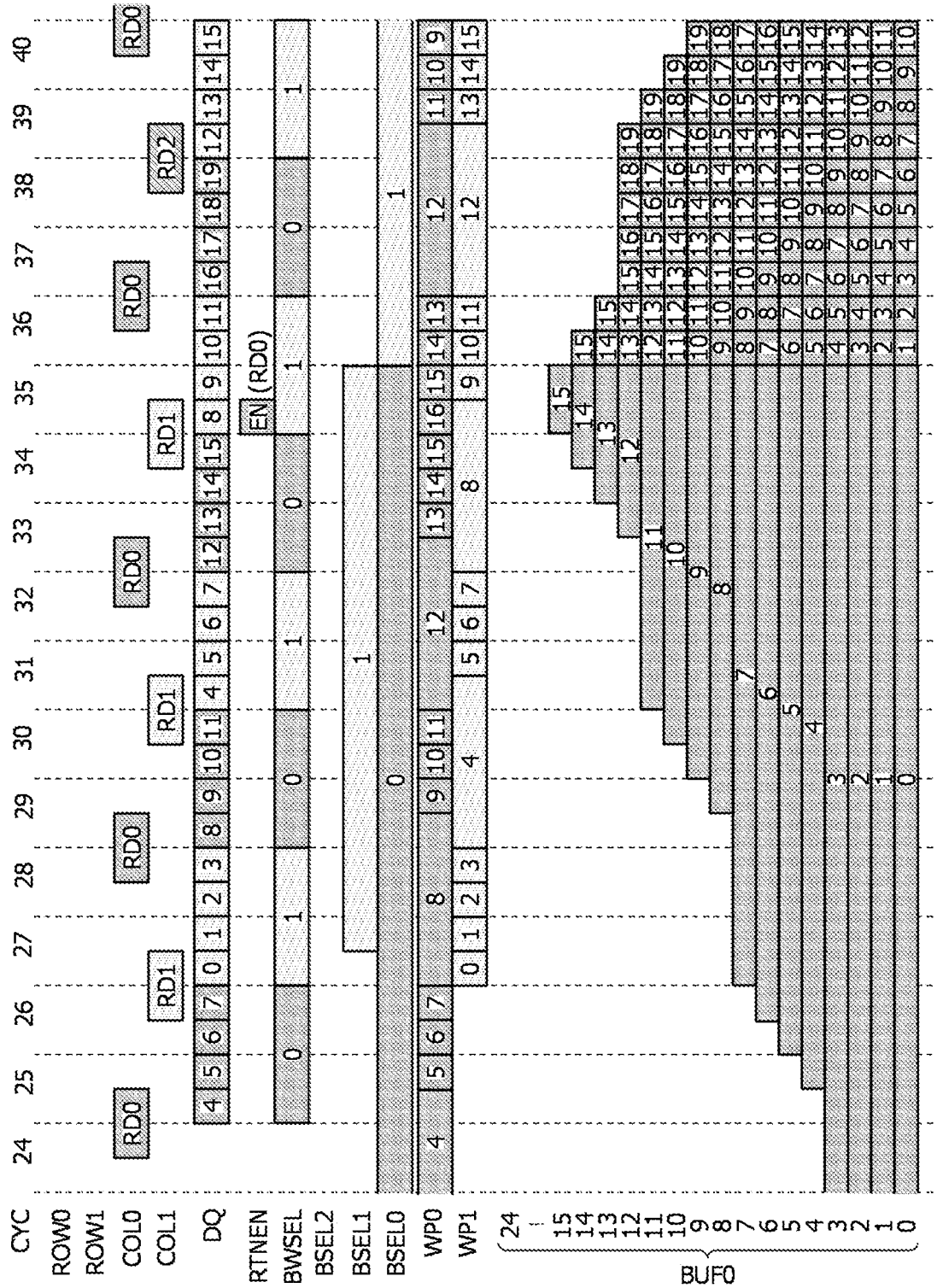
FIG. 13 is a timing chart illustrating continuation of FIG. 11.
Figure 14:
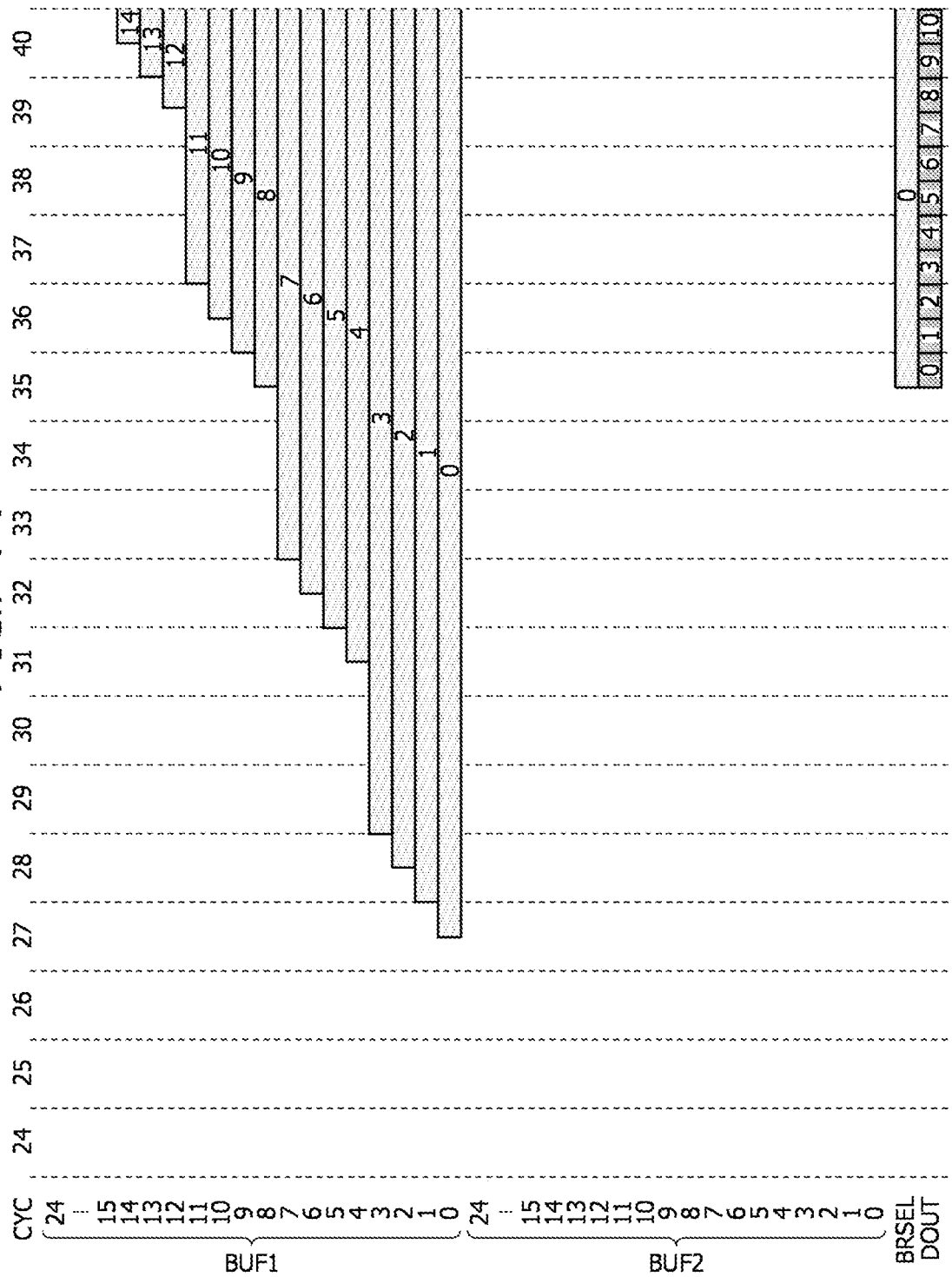
FIG. 14 is a timing chart illustrating continuation of FIG. 12.
Figure 15:
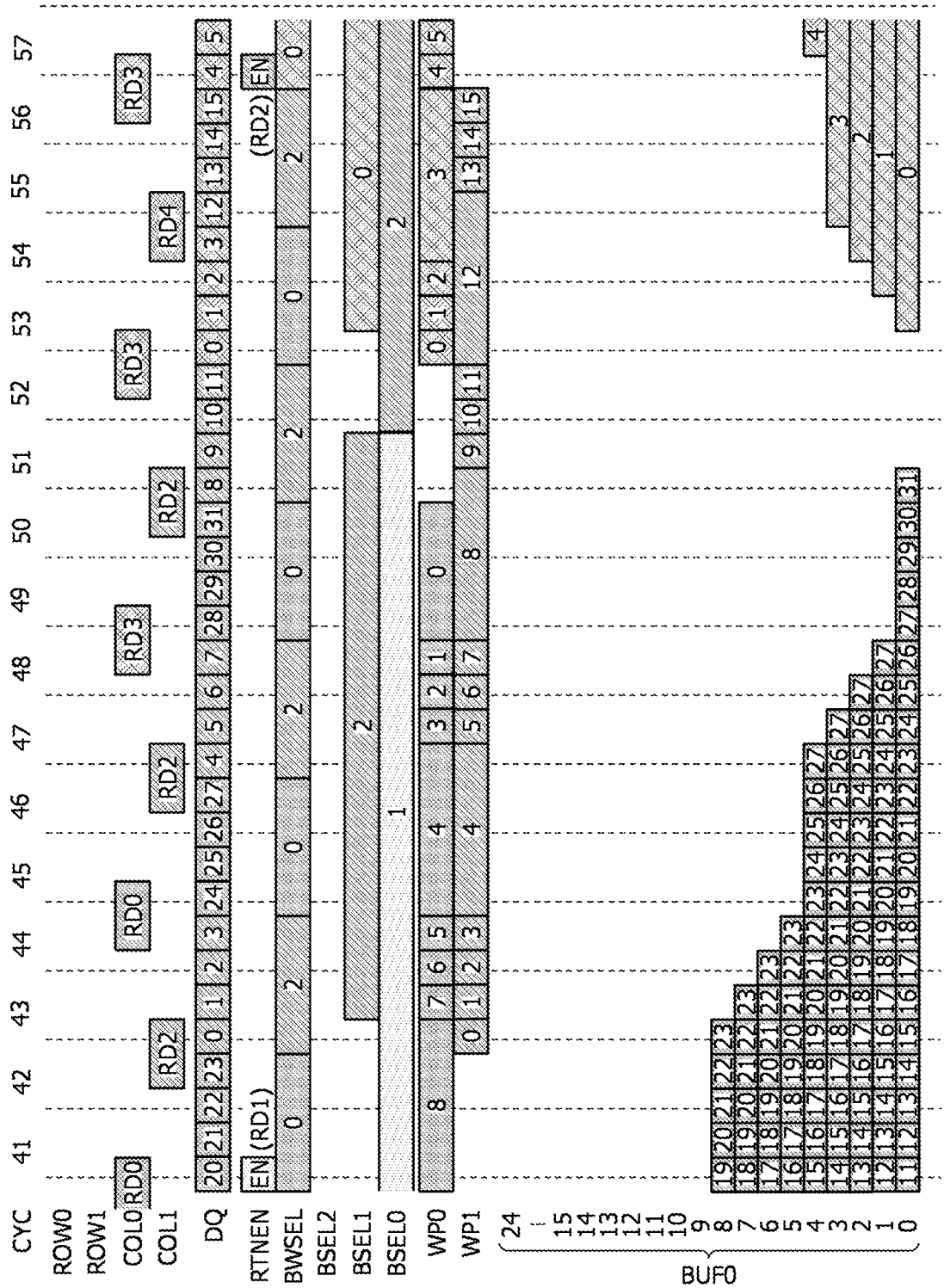
FIG. 15 is a timing chart illustrating continuation of FIG. 13.
Figure 16:
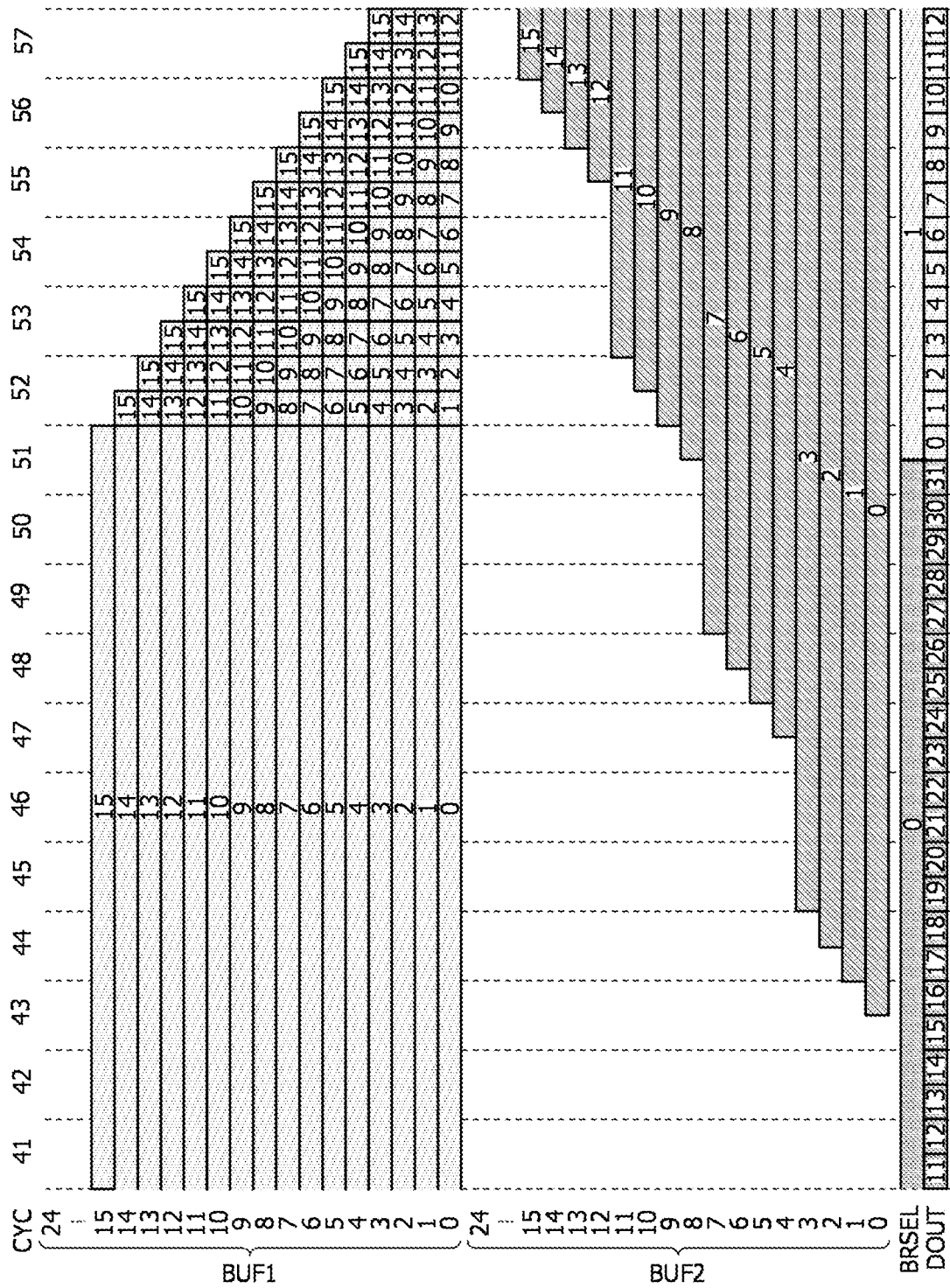
FIG. 16 is a timing chart illustrating continuation of FIG. 14.
Figure 17:
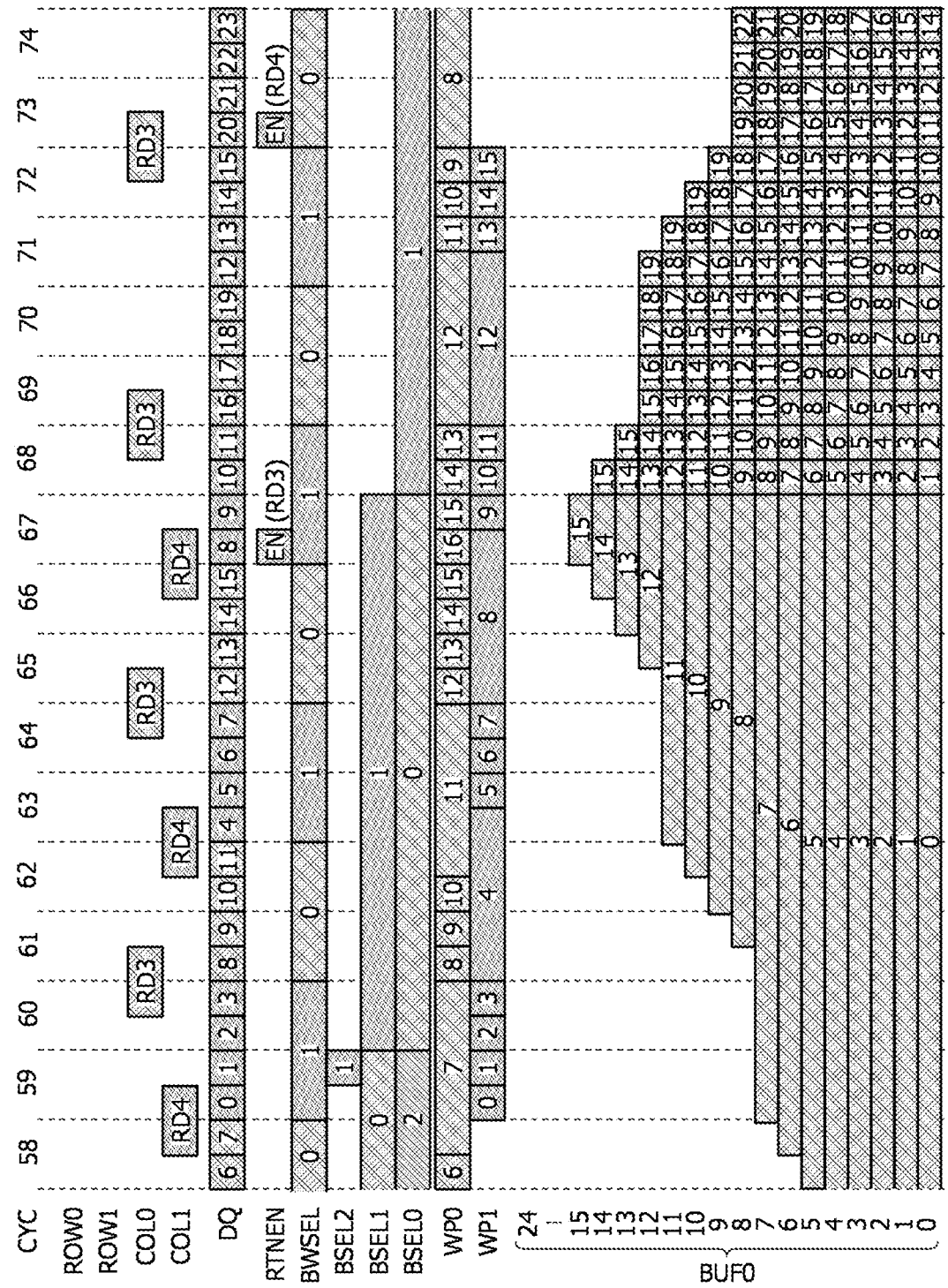
FIG. 17 is a timing chart illustrating continuation of FIG. 15.
Figure 18:
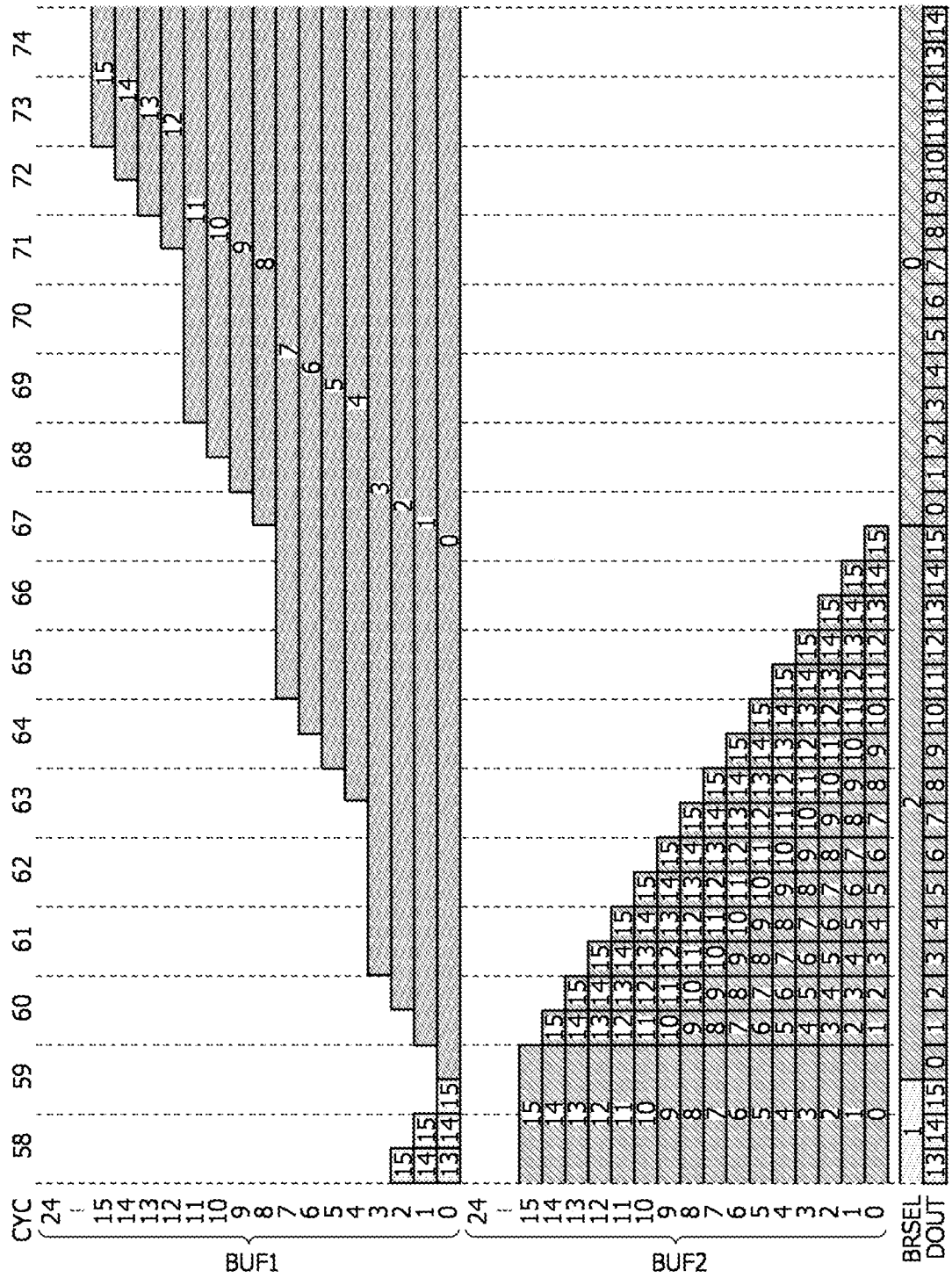
FIG. 18 is a timing chart illustrating continuation of FIG. 16.

FIGS. 11 and 12 illustrate an operation in the same cycle period, and FIGS. 13 and 14 illustrate an operation in the same cycle period. FIGS. 15 and 16 illustrate an operation in the same cycle period, and FIGS. 17 and 18 illustrate an operation in the same cycle period. Hereinafter, cycles CYC1 to CYC74, which are the numbers of elapsed cycles of the memory clock MCLK, are described by reference signs only. The packet size PS of the memory access request MREQ that is the source of the active command ACT0 is "32", and the packet size PS of the memory access request MREQ that is the source of the active command ACT1 is "16".

The access to the memory 30 up to CYC37 is similar to FIG. 10. For example, in FIGS. 11 to 18, the processing unit 250 of the memory access controller 20 outputs the first read command RD0 in CYC16, and outputs the subsequent read command RD0 seven times every four cycles. The processing unit 251 of the memory access controller 20 outputs the first read command RD1 in CYC22, and outputs the subsequent read command RD1 three times every four cycles.

The processing unit 251 outputs the first read command RD2 of the access of the second packet size PS corresponding to the active command ACT1 in CYC38 of FIG. 13, and outputs the subsequent read command RD2 three times every four cycles. The first read command RD2 for the second access is issued four cycles after the fourth read command RD1.

The processing unit 250 outputs the first read command RD3 of the access of the third packet size PS corresponding to the active command ACT1 in CYC48 of FIG. 15, and outputs the subsequent read command RD3 seven times every four cycles. The first read command RD2 for the second access is issued four cycles after the fourth read command RD1. The processing unit 251 outputs the first read command RD4 in CYC54, and outputs the subsequent read command RD4 seven times every four cycles.

The memory access controller 20 does not execute the access with another active command ACT to the memory 30 when outputting the active command ACT0, and the memory 30 is in the idle state of not operating at the time of the start in FIG. 11. For example, the memory access controller 20 independently receives the memory access request MREQ that triggers the active command ACT0. As described above, the idle state is determined on the basis of the independent request information REQALN included in the request information REQINF.

In the case where the memory 30 is in the idle state, the data output control unit DQCNTL in FIG. 9 outputs the write selection signal BWSEL of "0" in CYC21 in FIG. 11 on the basis of the reception of the data input timing signal DQIN from the processing unit 250 that has issued the active command ACT0. The write selection signal BWSEL of "0" indicates that the data DQ read from the memory 30 is stored in the buffer BUF0. Note that the processing unit 250 outputs the data input timing signal DQIN (not illustrated) in accordance with the output timing (for example, CYC21 and CYC22) of four consecutive data DQ from the memory 30.

The data output control unit. DQCNTL outputs the count-up signal CUP to the counter CONT0 on the basis of the data input timing signal DQIN from the processing unit 250. The counter CONT0 increases the write pointer value WP0 by "1" at a time in response to the count-up signal CUP in response to the output timing of the data DQ. Note that the initial values of the write pointer values WP0 and WP1 output by the counters CONT0 and CONT1, respectively, are "0".

The buffer selector BSEL in FIG. 9 retains "0" of the write selection signal BSSEL in the retention unit BSEL0 having the highest priority in CYC21. The selector SEL0 is selected by "0" retained in the retention unit. BSEL0, and the write pointer value WP0 is supplied to the buffer BUF0 via the selector SEL0. Then, the buffer BUF0 sequentially writes the data DQ0 to DQ31 corresponding to the read command RD0 to the entry indicated by the write pointer value WP0 from CYC21 to CYC51.

In FIG. 13, the data DQ4 to DQ7 are sequentially read from the memory 30 in CYC25 and CYC26 in response to the second read command RD0 in FIG. 11. Thereafter, four data DQ are alternately read from the memory corresponding to the read commands RD1 and RD0. The read command RD0 is issued eight times in order to read the thirty-two data DQ0 to DQ31 corresponding to the packet size PS from the memory 30. The read command RD1 is issued four times in order to read the sixteen data DQ0 to DQ15 corresponding to the packet size PS from the memory 30.

The data output control unit DQCNTL outputs the write selection signal BWSEL of "0" on the basis of the reception of the data input timing signal DQIN from the processing unit 250. Furthermore, the data output control unit DQCNTL outputs the write selection signal BWSEL of "1" on the basis of the reception of the data input timing signal DQIN from the processing unit 251. The write selection signal BWSEL of "1" indicates that the data DQ read from the memory 30 is stored in the buffer BUF1.

Note that, in FIGS. 11 to 18, "0" to "24" attached to each buffer BUF0 or BUF2 indicate entry numbers. On the timing chart, the numerical value attached to the entry of each buffer BUF0 or BUF2 indicates a number of the data DQ retained by each entry.

The data output control unit DQCNTL outputs the count-up signal CUP to each of the counters CONT0 and CONT1 on the basis of the data input timing signals DQIN from each of the processing units 250 and 251. Each count-up signal CUP is output in accordance with the reception timing of the data DQ from the memory 30. Thereby, each of the counters CONT0 and CONT1 increases each of the write pointer values WP0 and WP1 by "1".

In FIGS. 11 and 13, the retention unit BSEL0 retains "0" until the data DQ15 is stored in the buffer BUF0. Therefore, the buffer BUF0 that receives the write pointer value WP0 via the selector SEL0 sequentially writes the data DQ corresponding to the read command RD0 to the entry indicated by the write pointer value WP0.

In CYC27 of FIG. 13, the buffer selector BSEL retains "1" of the write selection signal BSSEL in the retention unit BSEL1 having the highest priority among the free retention units BSEL in response to the first reception of the write selection signal BWSEL of "1". The selector SEL1 is selected by "1" retained in the retention unit BSEL1, and the write pointer value WP1 is supplied to the buffer BUF1.

The retention unit BSEL1 retains "1" during CYC27 to CYC35, and the selector SEL1 is selected by the retention unit BSEL1 of "1". Therefore, in CYC27 to CYC35, the buffer BUF1 that receives the write pointer value WP1 via the selector SEL1 sequentially writes the data DQ corresponding to the read command RD1 to the entry indicated by the write pointer value WP0.

The data timing control unit 255 of the processing unit 250 that has output the active command ACT0 generates the enable signal EN (RD0) in CYC35 in FIG. 13. In this example, the data timing control unit 255 generates the enable signal EN (RD0) eighteen cycles after the output of the first read command RD0 (CYC35). The eighteen cycles are calculated by subtracting sixteen cycles needed for the output of the thirty-two output data DOUT from the thirty-four cycles from the output of the first read command RD0 to completion of the output of the output data DOUT. By outputting the enable signal EN corresponding to the read command RD0 in the CYC35, the data DQ31 can be output as the output data DOUT from the buffer BUF0 in CYC51 in which the data DQ31 is retained in the buffer BUF0.

The selection signal generation unit SELGEN that has received the enable signal EN from the processing unit 250 as the response enable signal RETEN outputs the buffer selection value="0" retained by the retention unit BSEL0 as the read selection signal BRSEL in CYC35 in FIG. 14. The output timing generation unit OTGEN in FIG. 9 sequentially outputs the data shift signal DSFT to the buffer BUF0 on the basis of the read selection signal BRSEL of "0". Thereby, the memory access controller 20 continuously outputs the data DQ0 to DQ31 retained in the buffer BUF0 to the network control unit 16 in FIG. 3 as the output data DOUT from CYC34 to CYC51 (FIGS. 14 and 16).

The selection signal generation unit SELGEN outputs the shift signal SFT to the buffer selector BSEL in response to the output of the read selection signal BRSEL of "0". The buffer selector BSEL performs the shift operation in response to the shift signal SFT, and transfers the buffer selection value="1" retained in the retention unit BSEL1 to the retention unit BSEL0 in CYC36 in FIG. 13. Thereby, it is determined that the output data DOUT is output from the buffer BUF1 after the output data DOUT from the buffer BUF0 is output.

The retention unit BSEL0 retains "1" during CYC36 to CYC51, and the selector SEL1 is continuously selected by the retention unit BSEL1 of "1". In CYC36 to CYC41, the buffer BUF1 that receives the write pointer value WP1 via the selector SEL1 sequentially writes the data DQ corresponding to the read command RD1 to the entry indicated by the write pointer value WP0.

The data output control unit DQCNTL outputs the count-down signal CDWN in accordance with the timing when the data DQ is output from the buffer BUF0. Thereby, the write pointer value WP0 decreases by "1" at a time from CYC36 in FIG. 13. Note that, in a case where the output of the data DQ from the buffer BUF0 and the storage of the data DQ read from the memory 30 in the buffer BUF0 are executed at the same time, the data output control unit DQCNTL stops the output of the countdown signal CDWN and the count-up signal CUP. Therefore, for example, in CYC37, CYC38, and the first half of CYC39, the data DQ15 to DQ19 are sequentially stored in the entry indicated by the write pointer value WP0="12" in the buffer BUF0.

In CYC41 of FIG. 15, the data timing control unit 255 of the processing unit 251 that outputs the read command RD1 generates the enable signal EN (RD1). In this example, the data timing control unit 255 generates the enable signal EN eighteen cycles after the output of the first read command RD1. The eighteen cycles are calculated by subtracting eight cycles needed for the output of sixteen output data DOUT from the eighteen cycles from the output of the first read command RD1 to completion of the output of the output data DOUT, and further adding eight cycles.

As illustrated in FIG. 11, when issuing the active command ACT1, the memory access controller 20 issues another active command ACT0 for the memory 30. Therefore, the memory 30 is not in the idle state. In the case where the memory 30 is not in the idle state, eight cycles are added to cause the output of the output data DOUT corresponding to the active command ACT1 to be performed after the output data DOUT corresponding to the preceding active command ACT0.

Here, the eighteen cycles are equal to the period from the first read command to the output of the enable signal EN in the memory access request MREQ with the longest packet size MPS among the memory access requests MREQ that can be accepted by the memory access controller 20. For example, in the case where the memory 30 is not in the idle state, the data timing control unit 255 sets the output start timing of the data corresponding to the subsequent memory access request MREQ to the output start timing of when receiving the memory access request with the longest packet size MPS. For example, in this embodiment, the longest packet size MPS corresponds to thirty-two data DQ.

Thereby, the period from the first read command RD to the output start timing of the data DQ can be a fixed period regardless of the packet size PS of the memory access request MREQ. Therefore, the output control of the enable signal EN by the data timing control unit 255 can be simplified as compared with the case where the output start timing is set according to the packet size PS of the preceding memory access request MREQ. Note that the data timing control unit 255 may set the output timing (for example, the output start timing) of the enable signal EN according to the packet size PS of the preceding memory access request MREQ.

Note that, in a case where no other active command ACT is issued at the time of issuance of the active command ACT1 and the memory 30 is in the idle state, the data timing control unit 255 generates the enable signal EN ten cycles after the output of the first read command RD1. The ten cycles are the output timing of the enable signal EN set according to an access specification (for example, the packet size PS=sixteen data DQ) of the device that issues the memory access request MREQ (ACT1). Thereby, the memory access controller 20 can output the data DOUT corresponding to the memory access request MREQ to the issuer device of the memory access request MREQ at the shortest timing.

In CYC41 of FIG. 15, the selection signal generation unit SELGEN receives the enable signal EN (RD1) from the processing unit 251 as the response enable signal RETEN. Since the data DQ is being output from the buffer BUF0, the selection signal generation unit SELGEN suppresses the output of the data DQ that responds to the response enable signal RETEN of the buffer selection value="1" retained by the retention unit BSEL1.

For example, the selection signal generation unit SELGEN sets the output start timing of the subsequent data DOUT so that the data DOUT of the subsequent memory access request MREQ is not output earlier than the final data DOUT corresponding to the preceding memory access request MREQ. Thereby, it is possible to suppress collision of the outputs of the data DQ from the buffers BUF0 and BUF1, and it is possible to suppress the malfunction of the memory access controller 20.

In CYC43 of FIG. 15, the buffer selector BSEL retains "2" of the write selection signal BWSEL in the retention unit BSEL1 having the highest priority among the free retention units BSEL in response to the first reception of the write selection signal BWSEL of "2". The selector SEL2 is selected by "2" retained in the retention unit BSEL1, and the write pointer value WP1 is supplied to the buffer BUF2. Then, the buffer BUF2 sequentially writes the data DQ corresponding to the read command RD2 to the entry indicated by the gradually increasing write pointer value WP1 from CYC43 in FIG. 16.

Note that whether to use either the write pointer value WP0 or WP1 is set by the data output control unit DQCNTL. The data output control unit DQCNTL determines use of the write pointer value WP0 after the idle state of the memory 30 is released, and then sequentially determines use of a free write pointer value WP.

In CYC51, the selection signal generation unit SELGEN reads the buffer selection value="1" retained by the retention unit BSEL0 and outputs the buffer selection value as the selection signal BRSEL (FIG. 16) in time with completion of the output of the data DQ31 from the buffer BUF0. The output timing generation unit OTGEN sequentially outputs the data shift signal DSFT to the buffer BUF1 on the basis of the read selection signal BRSEL of "1". Thereby, the memory access controller 20 sequentially outputs the data DQ0 to DQ15 retained in the buffer BUF1 to the network control unit 16 in FIG. 3 as the output data DOUT from CYC51 to CYC59 (FIGS. 16 and 18).

In this way, in the case where the memory 30 is not in the idle state, the memory access controller 20 can output the output data DOUT in the issuance order of the memory access request MREQ by delaying the output of the output data DOUT corresponding to the active command ACT. Therefore, it is possible to suppress the delay in data processing or the like by the issuer device of the memory access request MREQ due to the delay in the output data DOUT. As a result, it is possible to suppress deterioration of the processing performance of the device that receives the output data DOUT, depending on the operation of the memory access controller 20 that can process the memory access requests MREQ having a plurality of packet sizes PS.

Note that the data DQ0 to DQ15 read from the memory 30 corresponding to the read command RD1 when outputting the data DQ from the buffer BUF1 are already retained in the buffer SUFI. Therefore, the data output control unit DQCNTL does not generate the countdown signal CDWN that decreases the write pointer value WP1, and the write pointer value WP1 is not decreased from "15" (FIG. 13).

The selection signal generation unit SELGEN outputs the shift signal SFT to the buffer selector BSEL in response to the output of the read selection signal BRSEL of "1". The buffer selector BSEL performs the shift operation in response to the shift signal SFT, and transfers the buffer selection value="2" retained in the retention unit BSEL1 to the retention unit BSEL0 in CYC52 in FIG. 15. Thereby, it is determined that the output data DOUT is output from the buffer BUF2 after the output data DOUT from the buffer BUF1 is output.

In CYC57 of FIG. 15, the data timing control unit 255 of the processing unit 251 that outputs the read command RD2 generates the enable signal EN (RD2) so that the data DQ from the buffer BUF2 is output after the output of the data DQ from the buffer BUF1. The enable signal EN corresponding to the read command RD2 is generated eighteen cycles after the output of the first read command RD2, similar to the enable signal EN corresponding to read command RD1.

In CYC53 of FIG. 15, the buffer selector BSEL retains "0" of the write selection signal BWSEL in the retention unit BSEL1 in response to the first reception of the write selection signal BWSEL of "0" corresponding to the read command RD3. The retention unit BSEL1 that retains the write selection signal BWSEL "0" has the highest priority among the free retention units BSEL. The selector SEL0 is selected by "0" retained in the retention unit BSEL1, and the write pointer value WP0 is supplied to the buffer BUF0. Then, the buffer BUF0 sequentially writes data DQ corresponding to the read command RD3 from CYC53 to CYC83 (not illustrated) to the entry indicated by the gradually increasing write pointer value WP0.

The selection signal generation unit SELGEN receives the enable signal EN (RD2) from the processing unit 251 as the response enable signal RETEN. Since the data DQ is being output from the buffer BUF1, the selection signal generation unit SELGEN suppresses the output of the data DQ that responds to the response enable signal RETEN of the buffer selection value="2" retained by the retention unit BSEL0. Then, the selection signal generation unit SELGEN reads the buffer selection value="2" retained by the retention unit BSEL0 in the CYC59 and outputs the buffer selection value as the selection signal BRSEL in time with completion of the output of the data DQ15 from the buffer BUF1 (FIG. 18).

The output timing generation unit OTGEN sequentially outputs the data shift signal DSFT to the buffer BUF2 on the basis of the read selection signal BRSEL of "2". Thereby, the memory access controller 20 sequentially outputs the data DQ0 to DQ15 retained in the buffer BUF2 to the network control unit 16 in FIG. 3 as the output data DOUT from CYC59 to CYC67 of FIG. 18.

Note that the data DQ0 to DQ15 read from the memory 30 corresponding to the read command RD2 when outputting the data DQ from the buffer BUF2 are already retained in the buffer BUF2. Therefore, the data output control unit DQCNTL does not generate the countdown signal CDWN that decreases the write pointer value WP1, and the write pointer value WP1 is not decreased from "15" (FIG. 15).

In CYC59 of FIG. 17, the buffer selector BSEL retains "1" of the write selection signal BWSEL in the free retention unit BSEL2 in response to the first reception of the write selection signal BWSEL of "1" corresponding to the read command RD4. The selector SEL1 is selected by "1" retained in the retention unit BSEL2, and the write pointer value WP1 is supplied to the buffer BUF1. Then, the buffer BUF1 sequentially writes the data DQ corresponding to the read command RD4 to the entry indicated by the gradually increasing write pointer value WP1 from CYC59 in FIG. 18.

In CYC59 of FIG. 18, the selection signal generation unit SELGEN outputs the shift signal SFT to the buffer selector BSEL in response to the output of the read selection signal BRSEL of "2". The buffer selector BSEL performs the shift operation in response to the shift signal SFT. Then, in the CYC60 of FIG. 17, the buffer selector BSEL transfers the buffer selection value="0" retained in the retention unit BSEL1 to the retention unit BSEL0, and transfers the buffer selection value="1" retained in the retention unit BSEL2 to the retention unit BSEL1. Thereby, it is determined that the output data DOUT is output from the buffer BUF0 after the output data DOUT from the buffer BUF2 is output.

In CYC67 of FIG. 17, the data timing control unit 255 of the processing unit 250 that outputs the read command RD3 generates the enable signal EN (RD3) so that the data DQ from the buffer BUF0 is output after the output of the data DQ from the buffer BUF2. The enable signal EN corresponding to the read command RD3 is generated eighteen cycles after the output of the first read command RD3, similar to the enable signal EN corresponding to read command RD1.

The selection signal generation unit SELGEN receives the enable signal EN (RD3) from the processing unit 250 as the response enable signal RETEN. The selection signal generation unit SELGEN reads the buffer selection value="0" retained by the retention unit BSEL0 in the CYC67 and outputs the buffer selection value as the selection signal BRSEL in time with completion of the output of the data DQ15 from the buffer BUF2 (FIG. 18).

The output timing generation unit OTGEN sequentially outputs the data shift signal DSFT to the buffer BUF0 on the basis of the read selection signal BRSEL of "0". Thereby, the memory access controller 20 sequentially outputs the data DQ0 to DQ31 retained in the buffer BUF0 to the network control unit 16 in FIG. 3 as the output data DOUT from CYC67 to CYC83 (not illustrated).

In CYC73 of FIG. 17, the data timing control unit 255 of the processing unit 251 that outputs the read command RD4 generates the enable signal EN (RD4) so that the data DQ from the buffer BUF2 is output after the output of the data DQ from the buffer BUF0. The enable signal EN is generated eighteen cycles after the output of the first read command RD4, similar to the enable signal EN corresponding to read command RD1.

The selection signal generation unit SELGEN receives the enable signal EN from the processing unit 251 as the response enable signal RETEN. Since the data DQ is being output from the buffer BUF0, the selection signal generation unit SELGEN suppresses the output of the data DQ that responds to the response enable signal RETEN of the buffer selection value="1" retained by the retention unit BSEL0.

Thereafter, the selection signal generation unit SELGEN reads the buffer selection value="1" retained by the retention unit BSEL0 and outputs the buffer selection value as the selection signal BRSEL in time with completion of the output of the data DQ31 from the buffer BUF0. Then, although illustration is omitted, the memory access controller 20 sequentially outputs the data DQ0 to DQ31 retained in the buffer BUF1 to the network control unit 16 in FIG. 3 as the output data DOUT.

Figure 19:
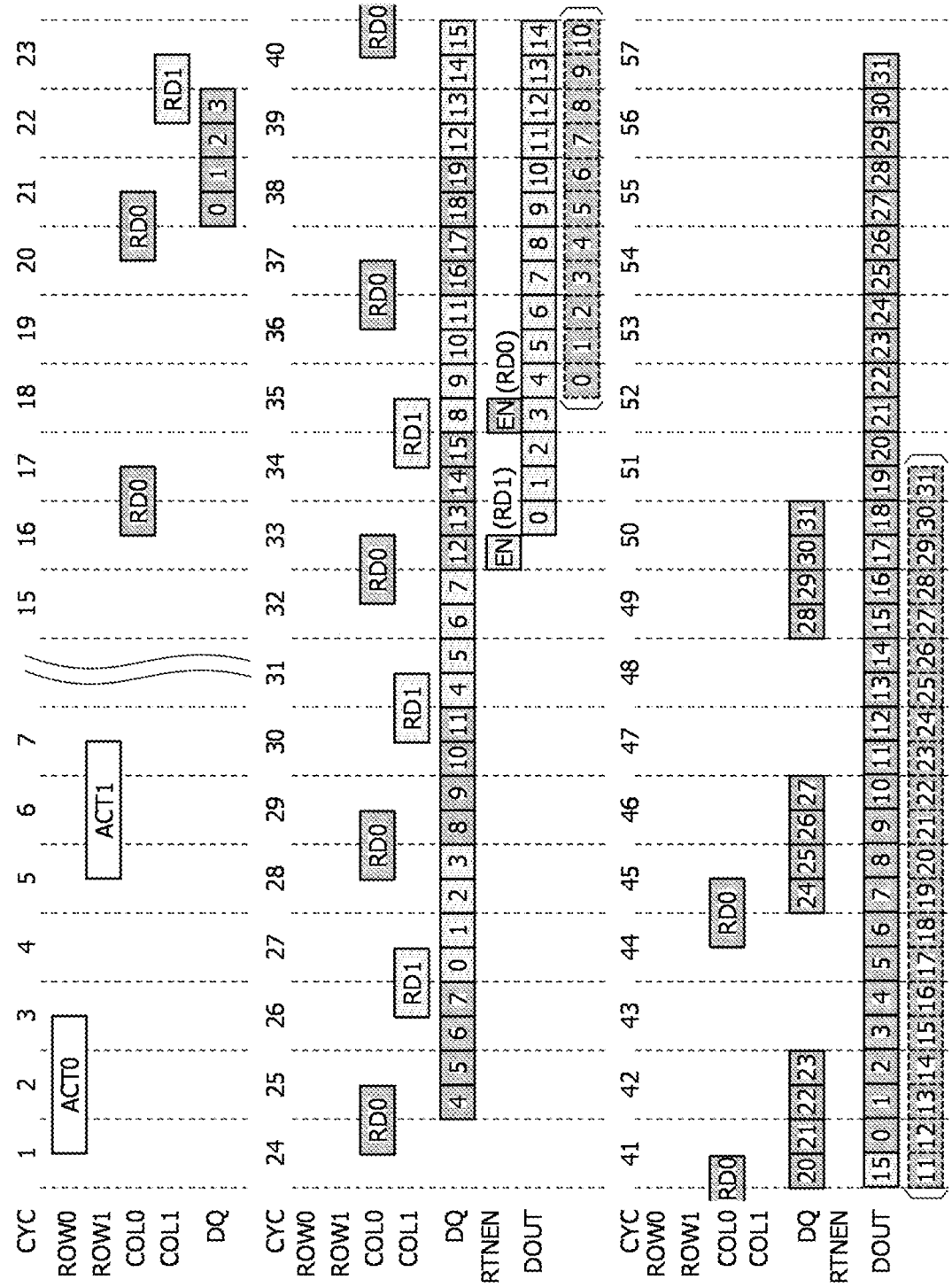
FIG. 19 is a timing chart illustrating an example of an operation of another memory access controller.

FIG. 19 illustrates an example of an operation of another memory access controller. Detailed description of operations similar to those in FIGS. 10 to 18 is omitted. The timing of the active commands ACT0 and ACT1 and the read commands RD0 and RD1 output from the memory access controller to the memory is the same as that in FIGS. 10, 11, 13, and 15. Note that, in FIG. 19, the read commands RD3 and RD4 are not issued.

The memory access controller that executes the operation illustrated in FIG. 19 does not have a function to determine whether another active command ACT is issued at the time of issuance of the active command ACT. The memory access controller that executes the operation of FIG. 19 does not have the function to delay the output of the output data DOUT from the buffer BUF in the case where the memory is not in the idle state.

Therefore, the memory access controller generates the enable signal EN (RD1) in CYC33, which is ten cycles after the output of the first read command RD1. Since another output data DOUT is not output from the buffer BUF, the memory access controller outputs the data DQ0 to DQ15 retained in the buffer BUF corresponding to the read command RD1 as the output data DOUT from CYC33 to CYC41.

The memory access controller generates the enable signal EN (RD0) in CYC35, which is eighteen cycles after the output of the first read command RD0. In CYC35, the output data DOUT corresponding to the read command RD1 is output from the buffer BUF. Therefore, the memory access controller outputs the output data DOUT corresponding to the read command RD0 from CYC41 to CYC57 after the output data DOUT corresponding to the read command RD1 is output from the buffer BUF.

The output data DOUT in broken line enclosed in the brackets in FIG. 19 indicates the output timing in response to the enable signal EN (RD0) in the case where another output data DOUT is not output from the buffer BUF. The memory access controller favorably outputs the data DQ read from the memory in the order of receiving the commands.

However, as illustrated in FIG. 19, in the memory access controller capable of processing the memory access requests MREQ having different packet sizes PS, the output order of the output data DOUT to the network control unit may be reversed depending on the reception order of the memory access requests MREQ. For example, in a case where a memory access request MREQ with a small packet size PS is issued after a memory access request MREQ with a large packet size PS, the output order of the output data DOUT may be reversed.

In the case where the output order of the output data DOUT is reversed, the data processing or the like using the data read from the memory by the issuer device of the memory access request MREQ may be delayed, and the processing performance of the device may deteriorate. Furthermore, in the case where the issuer system of the memory access request MREQ predicts a completion time of reception of the read data from the memory and speculatively operates on the basis of the predicted completion time, the speculative operation may be wasted.

As described above, an effect similar to the above-described embodiment can be obtained in this embodiment. For example, the memory access controller 20 can output the data DQ read from the memory 30 on the basis of the memory access requests MREQ having different packet sizes PS received from the inside or the outside of the CPU 10 in the reception order of the memory access requests MREQ.

When the output of the data DQ corresponding to the subsequent read command RD1 overlaps with the output of the data DQ corresponding to the preceding read command RD0, the buffer control unit 270 delays the start of output of the data DQ based on the enable signal EN (RD1). Thereby, it is possible to suppress the collision of the data DQ from a plurality of buffers BUF, and it is possible to suppress the output of erroneous data DQ (DOUT) from the memory access controller 20.

Moreover, in this embodiment, the following effects can be obtained. For example, in the case where the memory 30 is not in the idle state, the data timing control unit 255 sets the output start timing of the data corresponding to the subsequent memory access request MREQ to the output start timing of when receiving the memory access request with the longest packet size MPS. Thereby, the period from the first read command RD to the output start timing of the data DQ can be a fixed period regardless of the packet size PS of the memory access request MREQ. Therefore, the output control of the enable signal EN by the data timing control unit 255 can be simplified as compared with the case where the output start timing is set according to the packet size PS of the preceding memory access request MREQ.

The selection signal generation unit SELGEN sets the output start timing of the subsequent data DOUT so that the data DOUT of the subsequent memory access request MREQ is not output earlier than the final data DOUT corresponding to the preceding memory access request MREQ. Thereby, it is possible to suppress collision of the outputs of the data DQ from the buffers BUF0 and BUF1, and it is possible to suppress the malfunction of the memory access controller 20.

In the case where the memory 30 is in the idle state, the data timing control unit 255 sets the output timing of the enable signal EN according to the access specification (for example, the packet size PS) of the device that issues the memory access request MREQ. Thereby, the memory access controller 20 can output the data DOUT corresponding to the memory access request MREQ to the issuer device of the memory access request MREQ at the shortest timing.

The data output control unit DQCNTL counts down the counter CONT when outputting the data DQ from the buffer BUF with respect to the buffer BUF having the structure of the shift register. Thereby, even if a storage position of the new data DQ shifts due to the shift operation of the buffer BUF, the data DQ can be stored in the correct position.

Furthermore, the data output control unit DQCNTL stops the count-up and countdown of the counter CONT when storing the data DQ in the buffer BUF and outputting the data DQ from the buffer BUF at the same time. Thereby, it is possible to store the new data DQ at the same position in the buffer BUF regardless of the shift operation of the buffer BUF.

By arranging the selectors SEL0 to SEL2 between the counters CONT0 and CONT1 and the buffers BUF0 and BUF2, the write pointer value WP generated by any counter CONT can be supplied to any buffer BUF. As a result, the number of counters CONT can be made smaller than the number of buffers BUF, and the circuit scale of the memory access controller 20 can be reduced as compared with a case where the same number of counters CONT as the number of buffers BUF is provided.

FIG. 20 illustrates an example of a memory access controller in another embodiment. A memory access controller 21 has two processing units 25 and request retention pipelines 230 corresponding to each of the processing units 25, and the degree of parallelism l is "2". A memory access controller 22 has three processing units 25 and request retention pipelines 230 corresponding to each of the processing units 25, and the degree of parallelism l is "3".

The memory access controller 23 has three processing units 25 and request retention pipelines 230 corresponding to each of the processing units 25, and corresponds to both of the degrees of parallelism l of "2" and "3". The memory access controller 23 uses two processing units 25 connected to four stages STG in the case of the degree of parallelism l of "2", and uses three processing units 25 in the case of the degree of parallelism l of "3". A configuration of each processing unit 25 is similar to the configuration of the processing unit 25 illustrated in FIG. 8 except that the number of stages STG to be connected is smaller.

Each of the memory access controllers 21, 22, and 23 has a buffer control unit 270 and a data buffer 280 connected to each processing unit 25. Configurations of the buffer control unit 270 and the data buffer 280 are similar to those in FIG. 9. Thereby, each of the memory access controllers 21, 22, and 23 can obtain a similar effect to that of the above-described embodiment. For example, each of the memory access controllers 21, 22, and 23 can output data DQ read from a memory 30 on the basis of memory access requests MREQ having different packet sizes PS in a reception order of the memory access requests MREQ.

From the detailed description above, characteristics and advantages of the embodiments will become apparent. This intends that claims cover the characteristics and advantages of the embodiment described above without departing from the spirit and the scope of the claims. Furthermore, one of ordinary knowledge in the corresponding technical field may easily achieve various improvements and modifications. Therefore, there is no intention to limit the scope of the inventive embodiments to those described above, and the scope of the inventive embodiment may rely on appropriate improvements and equivalents included in the scope disclosed in the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
a memory, and
a memory access controller for controlling access to a memory on the basis of a plurality of memory access requests that has different data read sizes, wherein the memory access controller includes a processor coupled to the memory and configured to:
output, in a case of receiving a plurality of memory access requests, each of read commands that corresponds to the plurality of memory access requests to the memory;
generate an output start timing of the data read from the memory to an outside;
retain the data read from the memory that corresponds to each of the read commands in each of a plurality of buffers, and control operation of the plurality of buffers by causing any of the plurality of buffers to output data based on the output start timing; and
delay, in a case of receiving a subsequent memory access request during execution of memory access that corresponds to a preceding memory access request, the output start timing of data from the buffer that corresponds to the subsequent memory access request from the output start timing of data from the buffer that corresponds to the preceding memory access request,
wherein, in the case of receiving the subsequent memory access request during execution of memory access that corresponds to the preceding memory access request, the output start timing that corresponds to the subsequent memory access request is set to the output start timing of when receiving a memory access request with a maximum data read size among the plurality of memory access requests.

2. The arithmetic processing device according to claim 1, wherein,
in another case where the output start timing that corresponds to the subsequent memory access request is earlier than an output timing of final data from the buffer that corresponds to the preceding memory access request, the output start timing that corresponds to the subsequent memory access request is set to a timing later than the output timing of the final data.

3. The arithmetic processing device according to claim 1, wherein
each of the plurality of buffers has a shift register structure that performs a shift operation at a time of output of data, and
the processor is further configured to:
control a plurality of counters that generates a write pointer value that indicates a storage destination of data in each of the plurality of buffers, such that each of the plurality of counters counts up the counter when storing data in the buffer without outputting data from the buffer, counts down the counter when outputting data from the buffer without storing data in the buffer, and stops counting up and counting down the counter when outputting data from the buffer and storing data in the buffer.

4. The arithmetic processing device according to claim 3, wherein
the number of the counters is less than the number of the buffers, and the processor is further configured to supply the write pointer value generated by the counter to any of the buffers.

5. The arithmetic processing device according to claim 1, further comprising:
an arithmetic execution circuit configured to execute an arithmetic operation; and
an interface circuit connected to an external device; and
wherein the processor is configured to receive the memory access request output by the arithmetic execution circuit and the memory access request output by the external device via the interface circuit.

6. An arithmetic processing device comprising:
a memory, and
a memory access controller for controlling access to a memory on the basis of a plurality of memory access requests that has different data read sizes, wherein the memory access controller includes a processor coupled to the memory and configured to:
output, in a case of receiving a plurality of memory access requests, each of read commands that corresponds to the plurality of memory access requests to the memory;
generate an output start timing of the data read from the memory to an outside;
retain the data read from the memory that corresponds to each of the read commands in each of a plurality of buffers, and control operation of the plurality of buffers by causing any of the plurality of buffers to output data based on the output start timing; and
delay, in a case of receiving a subsequent memory access request during execution of memory access that corresponds to a preceding memory access request, the output start timing of data from the buffer that corresponds to the subsequent memory access request from the output start timing of data from the buffer that corresponds to the preceding memory access request, wherein, in the case where the memory access that corresponds to the preceding memory access request is not executed when receiving a memory access request, the output start timing is set to a timing according to an access specification of the received memory access request.

7. The arithmetic processing device according to claim 6, wherein each of the plurality of buffers has a shift register structure that performs a shift operation at a time of output of data, and the processor is further configured to:

control a plurality of counters that generates a write pointer value that indicates a storage destination of data in each of the plurality of buffers, such that each of the plurality of counters counts up the counter when storing data in the buffer without outputting data from the buffer, counts down the counter when outputting data from the buffer without storing data in the buffer, and stops counting up and counting down the counter when outputting data from the buffer and storing data in the buffer.

8. The arithmetic processing device according to claim 7, wherein the number of the counters is less than the number of the buffers, and the processor is further configured to supply the write pointer value generated by the counter to any of the buffers.

9. The arithmetic processing device according to claim 6, further comprising:

an arithmetic execution circuit configured to execute an arithmetic operation; and an interface circuit connected to an external device; and wherein the processor is configured to receive the memory access request output by the arithmetic execution circuit and the memory access request output by the external device via the interface circuit.

10. A memory access method on the basis of a plurality of memory access requests that has different data read sizes, wherein the memory access method comprising:

outputting, in a case of receiving a plurality of memory access requests, each of read commands that corresponds to the plurality of memory access requests to a memory;

generating an output start timing of the data read from the memory to an outside;

retaining the data read from the memory that corresponds to each of the read commands in each of a plurality of buffers, and controlling operation of the plurality of buffers by causing any of the plurality of buffers to output data based on the output start timing; and delaying, in a case of receiving a subsequent memory access request during execution of memory access that corresponds to a preceding memory access request, the output start timing of data from the buffer that corresponds to the subsequent memory access request from the output start timing of data from the buffer that corresponds to the preceding memory access request wherein, in the case of receiving the subsequent memory access request during execution of memory access that corresponds to the preceding memory access request, the output start timing that corresponds to the subsequent memory access request is set to the output start timing of when receiving a memory access request with a maximum data read size among the plurality of memory access requests.

* * * * *